US012482207B2

(12) United States Patent
Cooper et al.

(10) Patent No.: US 12,482,207 B2
(45) Date of Patent: Nov. 25, 2025

(54) POSITIONING CONTENT WITHIN 3D ENVIRONMENTS

(71) Applicant: Apple Inc., Cupertino, CA (US)

(72) Inventors: James R. Cooper, Los Angeles, CA (US); John Park, Chino, CA (US); Mariano Merchante, Los Angeles, CA (US); Brian A. Recktenwald, Burbank, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 18/214,865

(22) Filed: Jun. 27, 2023

(65) Prior Publication Data

US 2024/0005623 A1    Jan. 4, 2024

Related U.S. Application Data

(60) Provisional application No. 63/357,408, filed on Jun. 30, 2022.

(51) Int. Cl.
| | |
|---|---|
| *G06T 19/20* | (2011.01) |
| *G06T 7/20* | (2017.01) |
| *G06T 7/60* | (2017.01) |
| *G06T 7/70* | (2017.01) |

(Continued)

(52) U.S. Cl.
CPC ............. *G06T 19/20* (2013.01); *G06T 7/20* (2013.01); *G06T 7/60* (2013.01); *G06T 7/70* (2017.01); *G06V 10/60* (2022.01); *H04N 13/398* (2018.05); *G06T 2207/30196* (2013.01); *G06T 2219/2004* (2013.01); *G06V 2201/07* (2022.01)

(58) Field of Classification Search
CPC .. G06T 19/20; G06T 7/70; G06T 7/20; G06T 7/60; G06T 2219/2004; H04N 13/00; G06V 10/60
See application file for complete search history.

(56) References Cited

U.S. PATENT DOCUMENTS

| | | | |
|---|---|---|---|
| 10,928,974 B1 * | 2/2021 | Gribetz | G06F 3/04815 |
| 2009/0058850 A1 * | 3/2009 | Fun | A63F 13/211 |
| | | | 345/419 |
| 2009/0184972 A1 | 7/2009 | Webrew et al. | |

(Continued)

OTHER PUBLICATIONS

Jo, Hyungeun, "Aroundplot: Focus+context interface for off-screen objects in 3D environments", "Computers & Graphics" Aug. 2011, vol. 35, pp. 841-853 (Year: 2011).*

(Continued)

*Primary Examiner* — Terrell M Robinson
(74) *Attorney, Agent, or Firm* — Thompson Hine LLP

(57) ABSTRACT

Various implementations disclosed herein include devices, systems, and methods that provide a view of a three-dimensional (3D) environment in which virtual content is presented. For example, an example process may include obtaining virtual content and positioning the virtual content within a view of a 3D environment by determining on-screen content and off-screen content, positioning the on-screen content on a virtual screen within the 3D environment, and positioning off-screen content outside of the virtual screen within the 3D environment. The method may further include presenting the view of the 3D environment including a presentation of the on-screen content on the virtual screen and the off-screen content outside of the virtual screen.

25 Claims, 13 Drawing Sheets

(51) Int. Cl.
*G06V 10/60* (2022.01)
*H04N 13/398* (2018.01)

(56) References Cited

U.S. PATENT DOCUMENTS

| | | | |
|---|---|---|---|
| 2013/0229535 A1* | 9/2013 | Nakamura | H04N 23/633 348/207.1 |
| 2017/0228138 A1 | 8/2017 | Paluka et al. | |
| 2022/0044480 A1 | 2/2022 | Zavesky et al. | |
| 2022/0293065 A1* | 9/2022 | Day | G02B 27/017 |
| 2022/0295040 A1* | 9/2022 | Jayaram | G06T 7/73 |

OTHER PUBLICATIONS

Jo, Hyungeun, Hwang, Sungjae, Park, Hyunwoo and Ryu, Jung-hee; "Aroundplot: Focus_context interface for off-screen objects in 3D environments"; Computers & Graphics 35 (2011) 841-853.
Soether, Susanne O.; Bull, Synne T.; "Screen Space Reconfigured"; 2020; Amsterdam University Press; pp. 1-333.

* cited by examiner

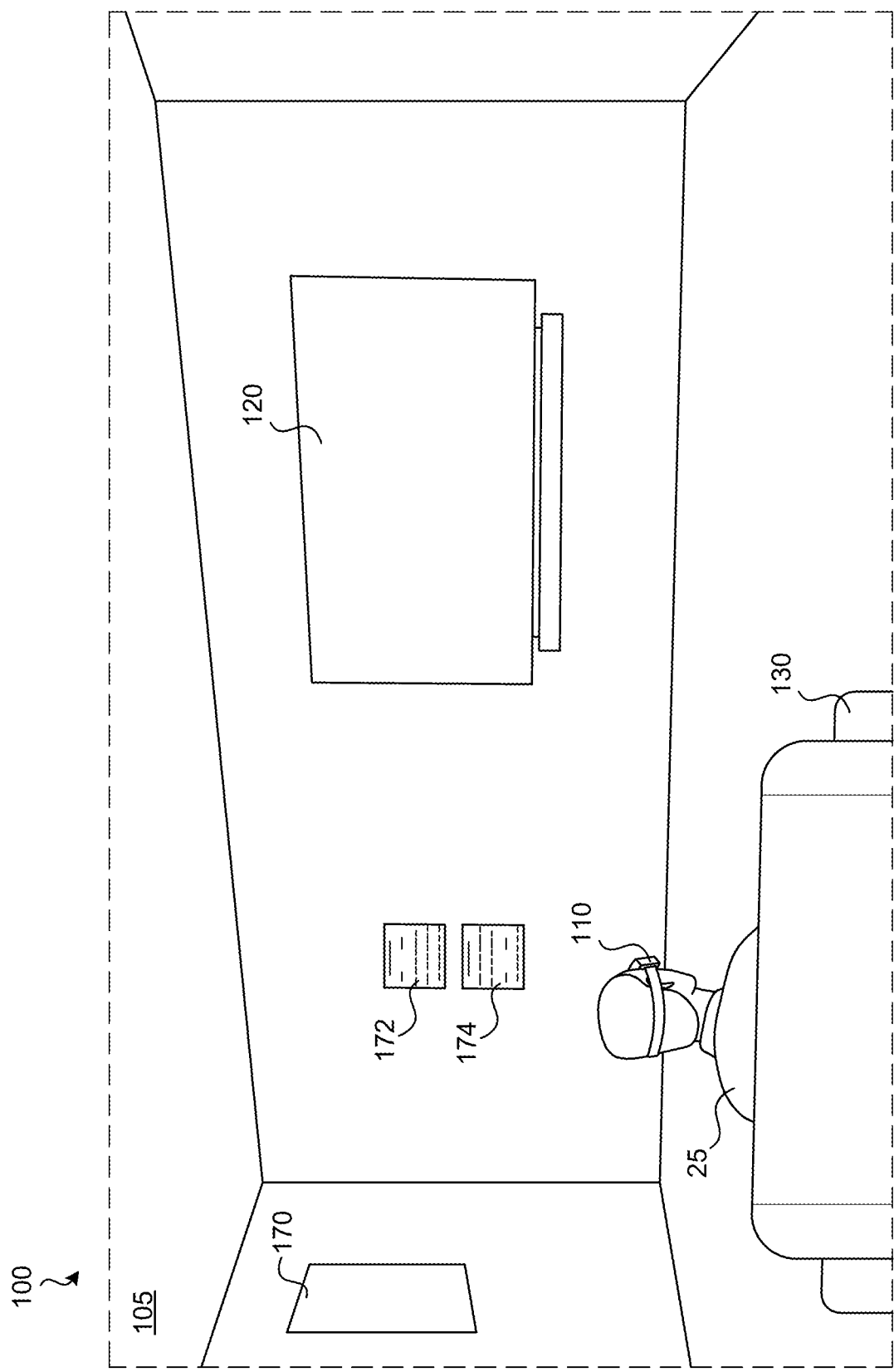

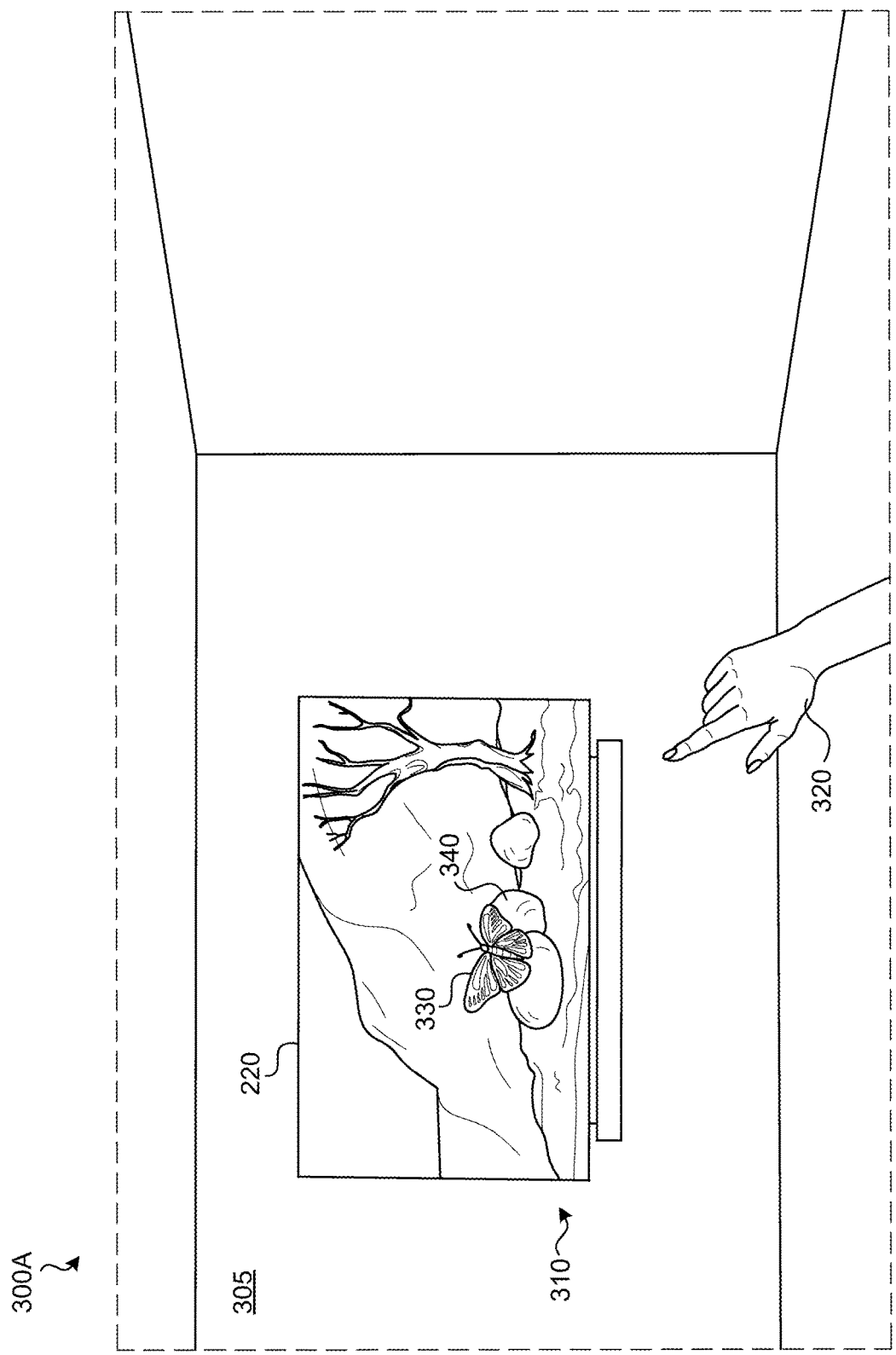

POSITIONING CONTENT WITHIN 3D ENVIRONMENTS

CROSS-REFERENCE TO RELATED APPLICATIONS

This application claims the benefit of U.S. Provisional Application Ser. No. 63/357,408 filed Jun. 30, 2022, which is incorporated herein in its entirety.

TECHNICAL FIELD

The present disclosure generally relates to displaying content with electronic devices and, in particular, to systems and methods that position content within a view of a three-dimensional (3D) environment.

BACKGROUND

Electronic devices are often used to present users with views that include virtual content and content from surrounding physical environments. It may be desirable to provide views of content within a three-dimensional (3D) environment in a way that is more interesting or engaging.

SUMMARY

Various implementations disclosed herein include devices, systems, and methods that provide a view of a three-dimensional (3D) environment in which content (e.g., two-dimensional (2D) or 3D images or video, a 3D model or geometry, a combination thereof, or the like) is presented. The content may be interactive or non-interactive and may be presented within a view of a 3D environment using a virtual screen. An on-screen portion of the content (e.g., background) may be presented on the virtual screen (e.g., on a bounded planar region) and an off-screen portion of the content (e.g., foreground, characters, certain objects) may be presented in 3D in front of that virtual screen or extending up/down/left/right beyond the confines of the virtual screen. The on-screen portion may be stereo and thus still have a 3D appearance. The 3D appearance of the off-screen content may be emphasized by its positioning at 3D positions in front of or beyond the boundaries of the virtual screen, e.g., a dinosaur may appear to be walking toward the viewer in the viewer's room. Determining which portions of the content are on-screen versus off-screen may be predetermined or determined at runtime, e.g., based on a character crossing a boundary. For example, determining when on-screen versus off-screen content is displayed may be based on tracking when a dinosaur crosses a particular boundary, based on input, user gaze/position, scene understanding, and the like.

In some implementations, the virtual content may be provided in one or more different set of views to improve a user's experience (e.g., while wearing a head mounted display (HMD)). Some implementations allow interactions with the virtual content (e.g., an application widget). In some implementations, a device (e.g., a handheld, laptop, desktop, or HMD) provides views of a 3D environment (e.g., a visual and/or auditory experience) to the user and obtains, with a sensor, physiological data (e.g., gaze characteristics) and motion data (e.g., controller moving the avatar, head movements, etc.) associated with a response of the user. Based on the obtained sensor data, the techniques described herein can determine a user's vestibular cues during the viewing of a 3D environment (e.g., an extended reality (XR) environment) by tracking the user's gaze characteristic(s) and other interactions (e.g., user movements in the physical environment). Based on the vestibular cues, the techniques can detect interactions with the virtual content and provide a different set of views to improve a user's experience while viewing the 3D environment.

In general, one innovative aspect of the subject matter described in this specification can be embodied in methods, at an electronic device having a processor, that include the actions of obtaining three-dimensional (3D) content. The methods further include the actions of positioning the content within a view of a 3D environment, wherein positioning the content includes determining on-screen content and off-screen content, positioning the on-screen content on a virtual screen within the 3D environment, and positioning off-screen content outside of the virtual screen within the 3D environment. The methods further include the actions of presenting the view of the 3D environment including a presentation of the on-screen content on a virtual screen and the off-screen content outside of the virtual screen.

These and other embodiments can each optionally include one or more of the following features.

In some aspects, the methods further include the actions of tracking a 3D location of an object within the virtual content, updating the view of the 3D environment based on the 3D location of the object.

In some aspects, the methods further include the actions of determining, based on the 3D location of the object within the content, that the object is on-screen content, off-screen content, or a combination thereof.

In some aspects, the methods further include the actions of modifying a level of ambient light based on the positioning of the off-screen content outside of the virtual screen within the 3D environment. In some aspects, the level of ambient light is modified within a threshold distance proximate to the off-screen content.

In some aspects, the methods further include the actions of determining a scene understanding of the 3D environment based on obtaining sensor data corresponding to the 3D environment, wherein the scene understanding determines geometric properties of one or more objects in the 3D environment, and updating the view of the 3D environment based on the scene understanding of the 3D environment.

In some aspects, the methods further include the actions of obtaining user information for a viewer of the view of the 3D environment, and updating the view of the 3D environment based on the user information.

In some aspects, the user information includes at least one of head pose data, positional information of the viewer within the 3D environment, and physiological data.

In some aspects, the off-screen content includes an active object and foreground content, and wherein positioning the off-screen content outside of the virtual screen within the 3D environment includes positioning the active object at a first 3D location at a first distance away from the virtual screen, and positioning the foreground content at a second 3D location at a second distance away from the virtual screen, wherein the first distance is different than the second distance.

In some aspects, the virtual content includes one or more selectable objects, and the methods further include the actions of detecting a user interaction with a first object of the one or more selectable objects when presenting the view of the 3D environment, and updating the view of the 3D environment based on detecting the user interaction.

In some aspects, determining the on-screen content and the off-screen content is based on a boundary corresponding to an outside edge of the virtual screen.

In some aspects, determining the on-screen content and the off-screen content is based on a bounding box associated with the virtual screen.

In some aspects, determining the on-screen content and the off-screen content is based on a boundary, and the methods further include the actions of tracking a 3D location of an object within the virtual content, updating the boundary based on the 3D location of the object, and updating the view of the 3D environment based on the 3D location of the object and the updated boundary.

In some aspects, the methods further include the actions of determining a positional relationship of a viewpoint of the view relative to the virtual content in the 3D environment, and updating the view of the 3D environment based on the positional relationship.

In some aspects, the virtual content includes one or more 3D models, and wherein the off-screen content is represented by at least one of the one or more 3D models. In some aspects, the on-screen content is represented by at least another of the one or more 3D models.

In some aspects, the virtual content includes a virtual surface textured with a 2D image, 3D image, 2D video, or a 3D video. In some aspects, the 3D image includes a stereoscopic image pair including left eye content corresponding to a left eye viewpoint and right eye content corresponding to a right eye viewpoint. In some aspects, the 3D video includes stereo video content stored as equirectangular projections. In some aspects, at least a portion of the on-screen content is represented by the textured virtual surface. In some aspects, the virtual surface comprises a portion of a cylindrical shell. In some aspects, the virtual surface is centered around a center of the virtual screen.

In some aspects, the methods further include the actions of determining a position to project the virtual content within the 3D environment based on a viewpoint of the view of the 3D environment.

In some aspects, the 3D environment is a physical environment. In some aspects, the 3D environment is a virtual environment. In some aspects, the 3D environment is an extended reality (XR) environment. In some aspects, the electronic device includes a head-mounted device (HMD).

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs. The one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1 illustrates a device presenting a view of a 3D environment to a user in a physical environment according to some implementations.

FIGS. 3A and 3B illustrate exemplary views of the electronic device of FIG. 1 based on a user interaction in accordance with some implementations.

Figure 2A:
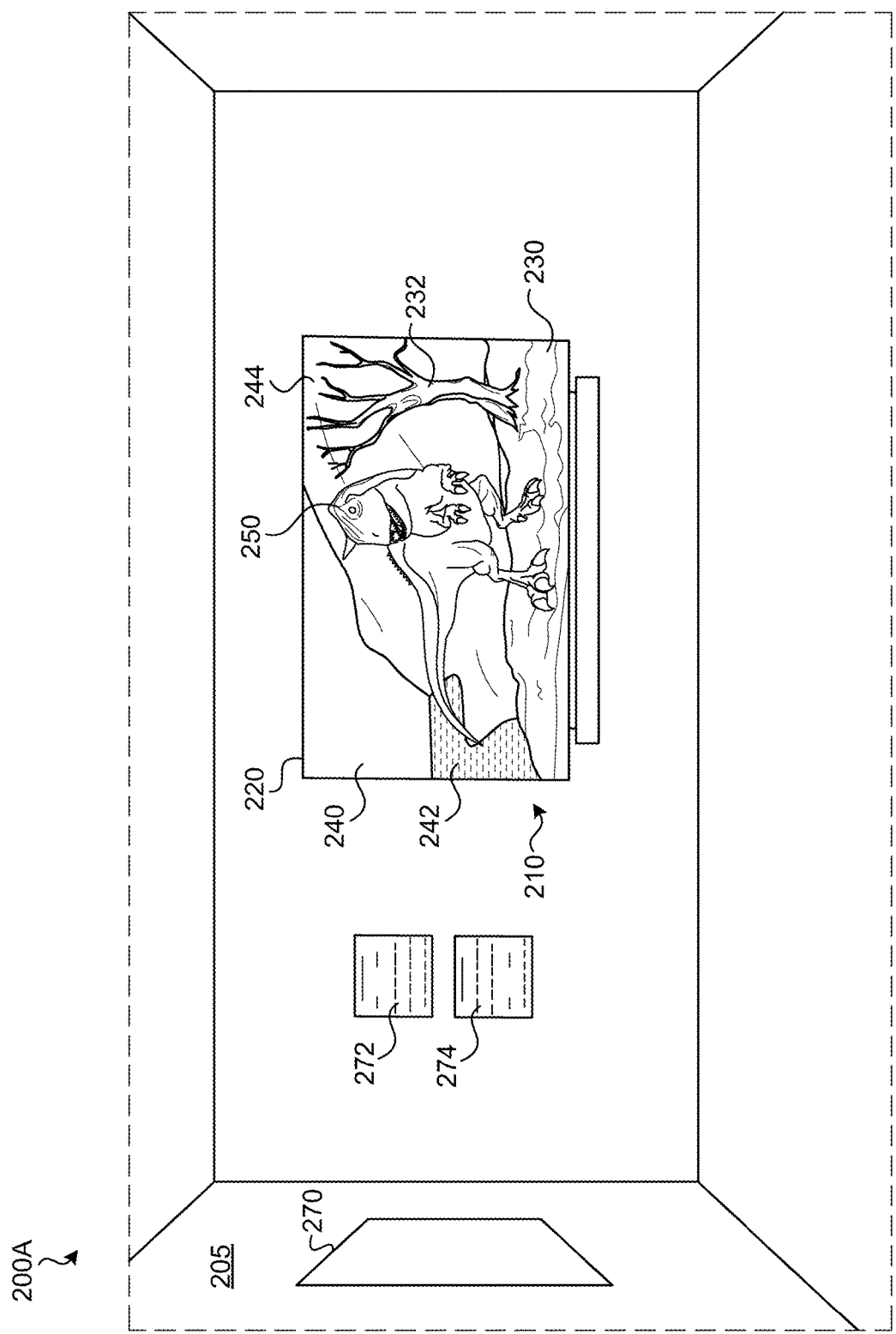
FIGS. 2A-2C illustrate exemplary views of the electronic device of FIG. 1 in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary physical environment 100. FIG. 1 illustrates an exemplary electronic device 110 operating in a room of the physical environment 100. In this example, the room includes a screen 120, a couch 130, wall hanging 170 (on a side wall), and wall hangings 172 and 174 (on a back wall the same as the screen 120). The screen 120 may be a physical structure or object (e.g., a projector screen), or the screen 120 may represent a space or area on the wall that the device 110 may display content to the user (e.g., a blank area on the wall to display content). In other examples, screen 120 may represent a space separate from a wall (or other surface) at which a virtual screen may be displayed (e.g., an open space in a room where a floating virtual screen may be displayed).

The electronic device 110 is illustrated as worn by the user 25, e.g., a head-mounted device (HMD). The device 110 may be worn by the user 25 in different embodiments. For example, electronic device 110 may be a watch, a head-worn device with an optical see-through or video pass-through view via optical elements (e.g., glasses), headphones, an ear-mounted device, and so forth. The electronic device 110 may be a hand-held device, mobile phone, a tablet, a laptop, and so forth. The device 110 may utilize one or more display elements to present views. For example, the device 110 can display views that include content in the context of an extended reality (XR) environment (e.g., virtual content displayed on the screen 120). In some implementations, the device 110 may enclose the field-of-view of the user 25. In some implementations, the functionalities of device 110 are provided by more than one device. In some implementations, the device 110 communicates with a separate controller or server to manage and coordinate an experience for the user. Such a controller or server may be located in or may be remote relative to the physical environment 100.

The electronic device 110 may include one or more cameras, microphones, depth sensors, motion sensors, or other sensors that can be used to capture information about and evaluate the physical environment 100 and/or the user 25 (e.g., physiological data).

In some implementations, the electronic device 110 may present a three-dimensional (3D) environment (e.g., an extended reality (XR) environment), and a visual characteristic of the 3D environment may continuously change. Head pose measurements may be obtained by an inertial measurement unit (IMU) or other tracking systems. In one example, a user can perceive a real-world physical environment while holding, wearing, or being proximate to an electronic device that includes one or more sensors that obtains physiological data to assess an eye characteristic that is indicative of the user's gaze characteristics, and motion data of a user.

In some implementations, a view of the 3D environment presented by electronic device 110 can occupy the entire display area of the display. For example, the content may include a sequence of images as the visual characteristic and/or audio cues presented to the user (e.g., 360-degree video on an HMD).

The device 110 may obtain physiological data (e.g., pupillary data) from the user 25 via a sensor (e.g., one or more cameras facing the user to capture light intensity data and/or depth data of a user's facial features and/or eye gaze). For example, the device 110 may obtain eye gaze characteristic data. While this example and other examples discussed herein illustrate a single device 110 in a real-world physical environment 100, the techniques disclosed herein are applicable to multiple devices as well as to virtual and other real-world physical environments. For example, the functions of device 110 may be performed by multiple devices.

In some implementations, the device 110 includes sensors for acquiring image data of the physical environment. The image data can include light intensity image data and/or depth data. For example, one sensor may be one or more video cameras for capturing RGB data, and another sensor may be one or more depth sensors (e.g., a structured light sensor, a time-of-flight sensor, or the like) for capturing depth data.

In some implementations, the device 110 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 110 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content shown on the display of the device 110.

In some implementations, the device 110 has a graphical user interface (GUI), one or more processors, memory and one or more modules, programs or sets of instructions stored in the memory for performing multiple functions. In some implementations, the user 25 interacts with the GUI through finger contacts and gestures on a touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 110 employs various sensors, detection, or measurement systems. In an exemplary implementation, detected physiological data includes head pose measurements determined by an IMU or other tracking system. In some implementations, detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 110 may concurrently detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, a machine learning model (e.g., a trained neural network) is applied to identify patterns in physiological data, including identification of physiological responses to viewing a 3D environment. Moreover, the machine learning model may be used to match the patterns with learned patterns corresponding to indications of interest or intent of the user 25 interactions. In some implementations, the techniques described herein may learn patterns specific to the particular user 25. For example, the techniques may learn from determining that a peak pattern represents an indication of interest or intent of the user 25 in response to a particular visual characteristic when viewing the 3D environment, and use this information to subsequently identify a similar peak pattern as another indication of interest or intent of the user 25. Such learning can take into account the user's relative interactions with multiple visual characteristics, in order to further adjust the visual characteristic and enhance the user's physiological response to the 3D environment.

In some implementations, the location and features of the head of the user 25 (e.g., an edge of the eye, a nose or a nostril) are extracted by the device 110 and used in finding coarse location coordinates of the eyes of the user 25, thus simplifying the determination of precise eye features (e.g., position, gaze direction, etc.) and making the gaze characteristic(s) measurement more reliable and robust. Furthermore, the device 110 may readily combine the 3D location of parts of the head with gaze angle information obtained via eye part image analysis in order to identify a given on-screen object at which the user 25 is looking at any given time. In some implementations, the use of 3D mapping in conjunction with gaze tracking allows the user 25 to move his or her head and eyes freely while reducing or eliminating the need to actively track the head using sensors or emitters on the head.

In some implementations, a pupillary response may be in response to an auditory stimulus that one or both ears of the user 25 detect. For example, device 110 may include a speaker that projects sound. The device 110 may include other audio sources such as a headphone jack for headphones, a wireless connection to an external speaker, and the like.

According to some implementations, the electronic devices described herein (e.g., electronic device 110) can generate and present an extended reality (XR) environment to one or more users during a communication session.

Figure 2B:
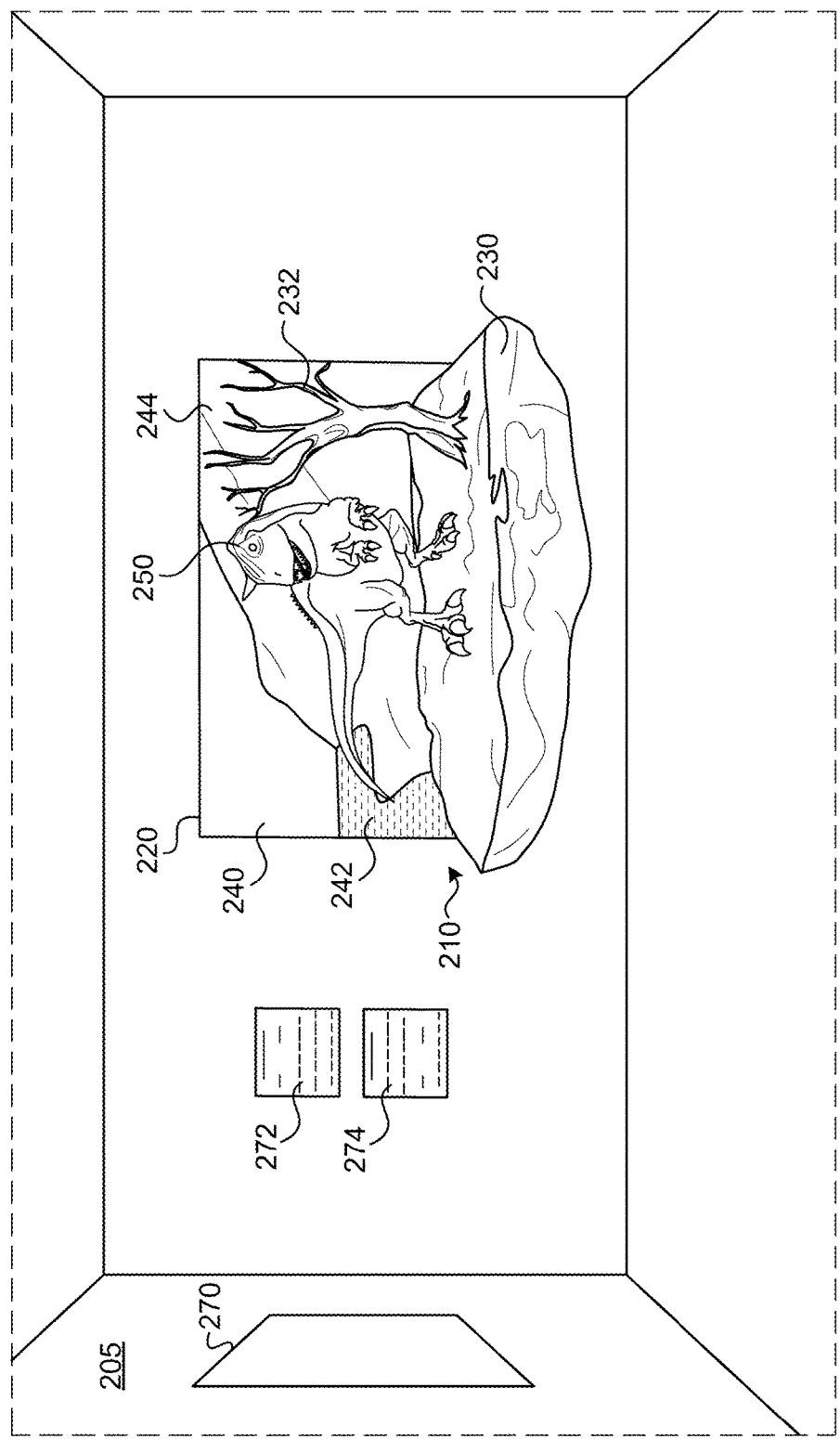
Figure 2C:
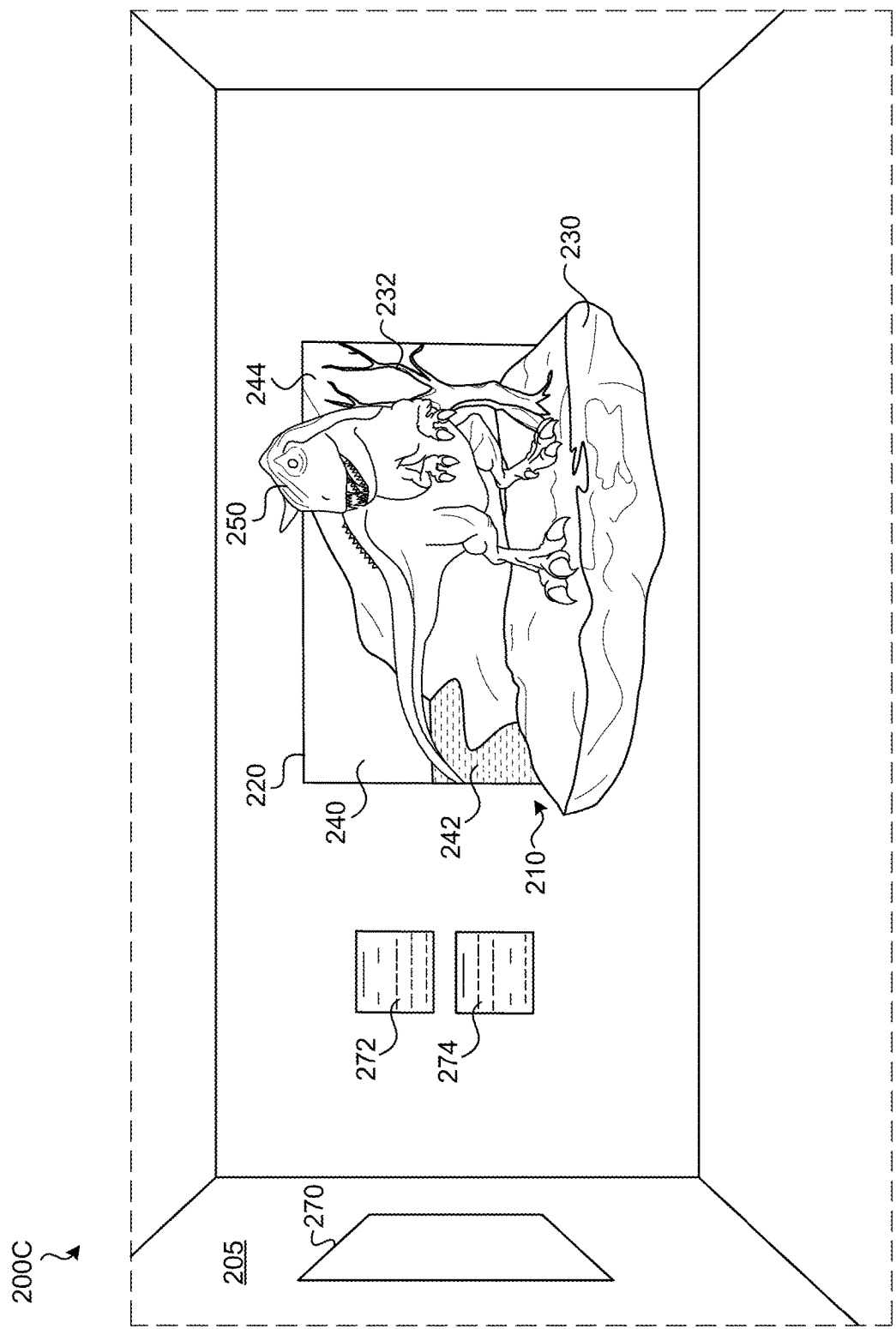

FIGS. 2A-2C illustrate exemplary views 200A-200C, respectively, of a 3D environment 205 provided by electronic device 110 of FIG. 1. The views 200A-200C may be a live camera view of the physical environment 100, a view of the physical environment 100 through a see-through display, or a view generated based on a 3D model corresponding to the physical environment 100. The views 200A-200C include depictions of aspects of a physical environment 100 such as a representation 220 of screen 120, representation 270 of wall hanging 170, representation 272 of wall hanging 172, and representation 274 of wall hanging 174 within a view 200 of the 3D environment 205.

FIGS. 2A-2C further illustrate multiple rendered frames of content 210 (e.g., 2D or 3D images or video, a 3D model or geometry, a combination thereof, or the like) within the views 200A-200C of the 3D environment 205. The content 210 in the illustrated examples provided herein (e.g., a depiction of a dinosaur walking along a rocky cliff near a body of water) includes different elements that can be displayed differently based on one or more criterion, as further discussed herein. For example, the content 210 includes various elements, such as a foreground rock formation 230, a tree 232 on top of the foreground rock formation 230, a body of water 242, a sky 240, a mountain 244, and a character 250 (e.g., the dinosaur). In some examples, each of these elements may be represented by a 3D model. In these examples, views of content 210 may be rendered based on the relative positioning between the 3D model(s), representation 220 of screen 120, and a viewing position (e.g., based on the position of device 110). In other examples, certain elements, such as background elements (e.g., sky 240, body of water 242, mountain 244), may be represented by 2D or 3D images or video positioned behind foreground and midground elements (e.g., foreground rock formation 230, tree 232, and character 250), which may be represented by 3D models. The 2D or 3D images or video may be textured onto a virtual surface (e.g., a curved surface, such as a portion of a cylindrical shell) positioned behind the 3D models. In these examples, views of content 210 may be rendered based on the relative positioning between the 3D model(s), representation 220 of screen 120, textured surface, and a viewing position (e.g., based on the position of device 110).

View 200A of FIG. 2A depicts the content 210 as being presented on a two-dimensional bounded planar region of the representation 220 of the screen 120 (e.g., a virtual screen). In some examples, the content 210 may be displayed by device 110 as standard 2D content using a single image representing content 210 (optionally viewed stereoscopically within 3D environment 205) positioned on a bounded planar region (e.g., a television or projection screen, such as representation 220 of screen 120). In other examples, the content 210 may be displayed by device 110 as 3D content using a stereoscopic pair of images representing content 210 positioned on a bounded planar region such that the bounded planar region acts as a viewing portal into the environment represented by content 210. FIGS. 2B and 2C illustrate positioning different portions of the content 210 in front of or outside of the representation 220 of the screen 120. For example, some content such as background or midground content (e.g., also referred to herein as on-screen content) may remain presented as being within the bounded planar region of the representation 220 of screen 120, and other content such as foreground content (e.g., also referred to herein as off-screen content) and/or characters (e.g., people, animals, objects in motion, and the like) may be presented as coming out of the bounded planar region of the representation 220 of screen 120.

In particular, view 200B of FIG. 2B illustrates the foreground rock formation 230 and at least portions of the tree 232 as foreground content presented in front of the representation 220 of the screen 120, while the remaining portions of the content 210 remain presented on or behind the planar region of the representation 220 of the screen 120 (e.g., character 250, sky 240, body of water 242, mountain 244, etc.). View 200C of FIG. 2C illustrates a similar view as view 200B with the on-screen and off-screen content, except that view 200C now includes the character 250 (e.g., the dinosaur) as foreground content (off-screen content) presented in front of the representation 220 of the screen 120 (e.g., walking closer towards the user 25), while the remaining portions of the content 210 remain presented on or behind the planar region of the representation 220 of the screen 120 (e.g., sky 240, body of water 242, mountain 244, etc.).

In some implementations, the 3D appearance of the off-screen content may be emphasized by its positioning at 3D positions in front of or beyond the boundaries of the virtual screen (e.g., the planar region of the representation 220 of the screen 120). For example, a dinosaur (character 250) may appear to be walking toward the viewer in the viewer's room. Determining which portions of the content 210 are on-screen versus off-screen may be predetermined or determined at runtime. For example, determining which portion of the content is to be visualized as off-screen content may be based on portions of the content crossing a boundary line (e.g., tracking when an object, such as a dinosaur, crosses a boundary). Additionally, or alternatively, determining which portion of the content may be visualized as off-screen content may be based on user input, a user gaze and/or position, scene understanding, and the like.

Figure 3B:
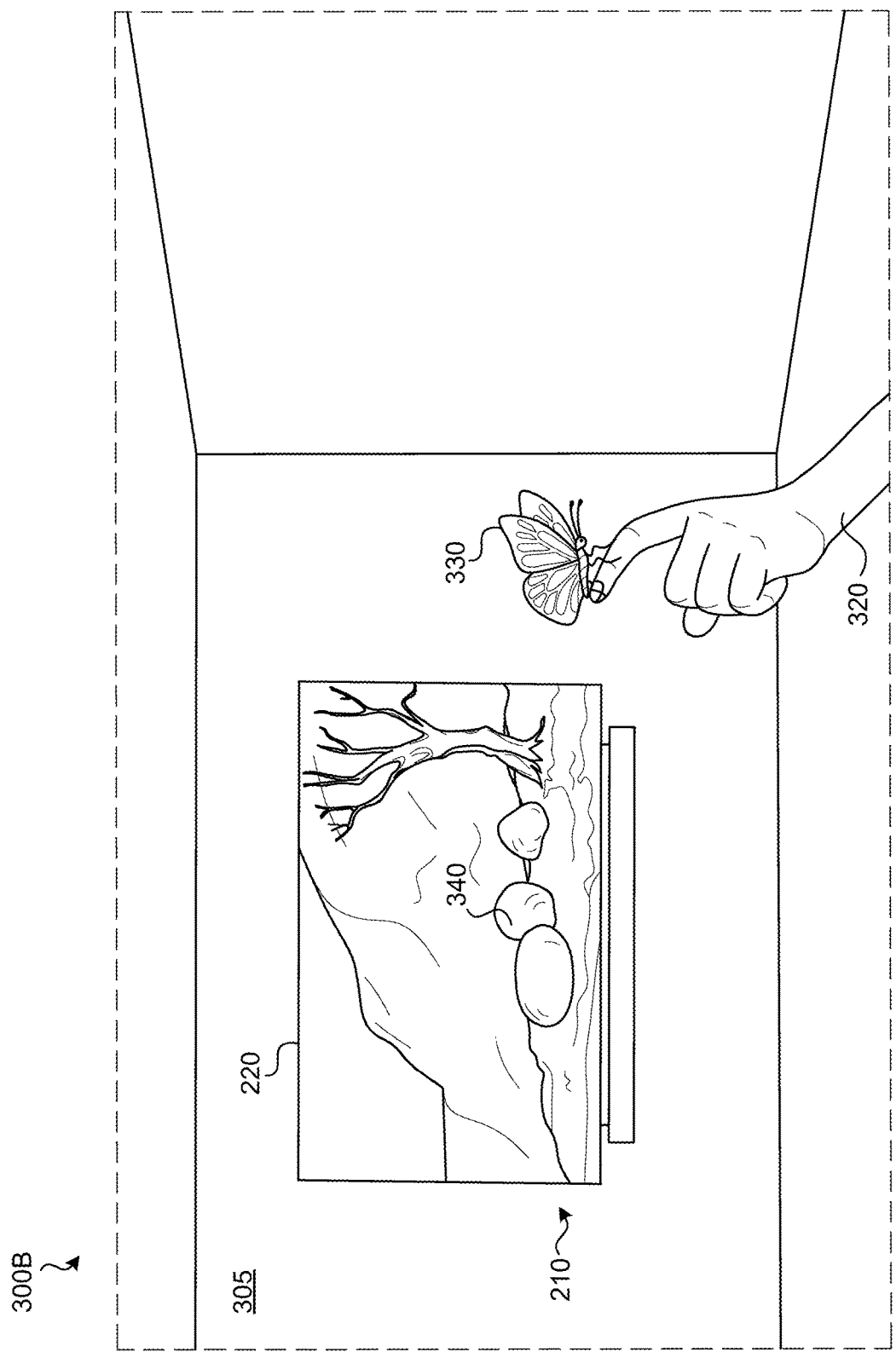

FIGS. 3A, 3B illustrate exemplary views 300A and 300B, respectively, of a 3D environment 305 provided by electronic device 110 of FIG. 1. The views 300A and 300B may be a live camera view of the physical environment 100, a view of the physical environment 100 through a see-through display, or a view generated based on a 3D model corresponding to the physical environment 100. The views 300A and 300B include depictions of aspects of a physical environment 100 such as a representation 220 of screen 120 within a view 300 of the 3D environment 305.

Views 300A and 300B illustrate content 310 that is different content than content 210 from the view 200 of FIG. 2. For example, each view 300A and 300B illustrates the character 330 (e.g., a virtual butterfly) and the background rock formation 340 as on-screen content (e.g., content presented on top of the bounded planar region of the representation 220 of the screen 120). View 300A illustrates the character 330 sitting on top of the rock formation 340 with the user 25 pointing to the character 330 as illustrated by a representation 320 of the user's 25 hand (e.g., initiating an action towards the virtual character—the butterfly). View 300B illustrates the character 330 sitting on top of the representation 320 of the user's 25 hand based on the action of the user in view 300A (e.g., pointing towards the virtual character 330, the butterfly, which then flies towards and lands on the representation 320 of the user's 25 hand). For example, the content 310 may have an interactable element (e.g., a virtual butterfly), and techniques described herein may be able to generate additional content for a particular object or all of the content and show that content extending in a direction outside of the planar region of the representation 220 of the screen 120. The interaction of the virtual character 330 may be determined based on tracking gaze information and/or hand tracking information of the user 25 using on or more sensors of the device 110. For example, inward facing cameras and other infrared detection systems may be able to track the gaze direction of the user 25, and downward facing and external facing cameras of the device 110 may be able to track the movements of the user's 25 hand as he or she tries to interact with the content 310.

FIGS. 3A and 3B illustrate interactive 3D virtual elements (e.g., character 330—a virtual butterfly) that may be configured to react/interact with a user, the environment, the content being displayed, or a combination thereof. In some implementations, different actions or different physical environments (e.g., lighting conditions, people or animals present in the environment, etc.) may influence the behavior or actions of the virtual element/characters. For example, virtual characters may be configured to look at the user and around their real-world environment, respond to user audio inputs (e.g., virtual character might turn to look at the user if they make a noise), track head and/or hand positioning and appear to switch attention between a user's eyes and hands (e.g., a virtual dog watching a bone and then switching to watching the user's eyes), and/or move their body positioning based on user movement in 3D space (e.g., a virtual character might back up if a user approaches, or come closer if a user backs away). For example, a virtual dog character presented within the content 310 could leave the planar region of the representation 220 of the screen 120, walk towards the location of the user 25, and drop a virtual bone in front of the user 25. Then the user 25 could pick up the virtual bone and throw the virtual bone back into the content 310, and the virtual dog may appear to chase the virtual bone and reenter the constraints of the representation 220 of the screen 120 (e.g., a 3D virtual character enters a 2D planar environment). In other words, the user 25 can play "virtual fetch" with a virtual dog character presented within the content 310. In some implementations, virtual characters could track real life lighting in the physical environment and react to detecting lighting effects based on the light's spectral, positional, and/or directional information associated with the light (e.g., a virtual character could look at the strongest source of lighting inside of a dark room, and do different things based on the lighting attributes).

Figure 4:
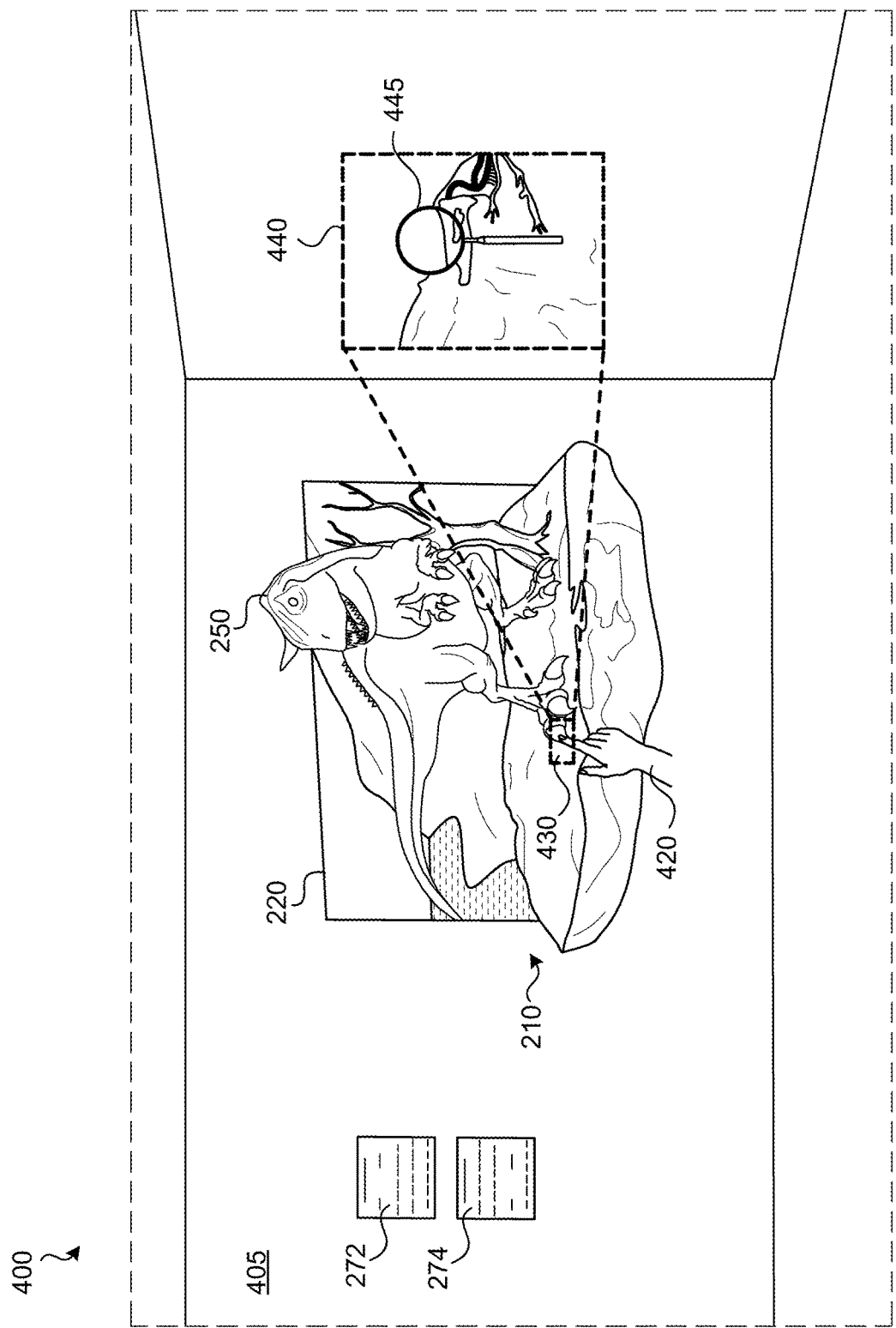
FIG. 4 illustrates an exemplary view of the electronic device of FIG. 1 based on a user interaction in accordance with some implementations.

FIG. 4 illustrates an exemplary view 400 of a 3D environment 405 provided by electronic device 110 of FIG. 1. The view 400 may be a live camera view of the physical environment 100, a view of the physical environment 100 through a see-through display, or a view generated based on a 3D model corresponding to the physical environment 100. The view 400 include depictions of aspects of a physical environment 100 such as a representation 220 of screen 120, representation 272 of wall hanging 172, and representation 274 of wall hanging 174 within a view 400 of the 3D environment 405.

View 400 of FIG. 4 includes a similar view of the content 210 as the view 200C of FIG. 2C (e.g., watching the content 210 at the same point in time such as the same rendered frame). For example, the character 250 and the foreground rock formation 230 are presented as off-screen content, while the remaining portions of the content 210 remain as viewed on the planar region of the representation 220 of the screen 120 (e.g., body of water 242, sky 240, mountain 244, etc.). However, view 400 differs from view 200C in that the user is viewing the content 210 from a different perspective (e.g., the user 25 is standing up or viewing from a different location in the physical environment 100). For example, the user in the example illustrated by FIG. 4, is now at a different location in the physical environment 100 (e.g., standing up) and interacting with the content 210 as illustrated by a representation 420 of the user's 25 hand. In particular, the user 25 is reaching for and trying to touch a 3D location in the physical environment 100 that appears to the user 25 as an area 430 of the content 210 (e.g., touching a foot of the dinosaur). Alternatively, an input device may be used to interact with the content 210 rather than the user 25 reaching out to touch a 3D location. For example, an input device may include a wand, a pointer, or another object that the system (e.g., an HMD) can recognize and determine that the user is reaching out to interact with a portion of the content 210.

When the user 25 interacts with the content 210 in this example, the system displays an interactive window 440 that includes a tool 445 (e.g., a magnifying glass) for the user to further explore the content 210 (if applicable). Additionally, other applications and interactive tools may be provided when the user interacts with one or more portions of the content 210. Moreover, in some implementations, a user may be able to select a portion of the content 210 that he or she wants to become off screen content. For example, a user may be viewing view 200B of FIG. 2B, and select the character 250 (e.g., touching an area that appears to be selecting/touching the dinosaur), and then the system can extend the character 250 outside of the planar region of representation 220 of the screen 120 as shown in view 200C of FIG. 2C.

Figure 5A:
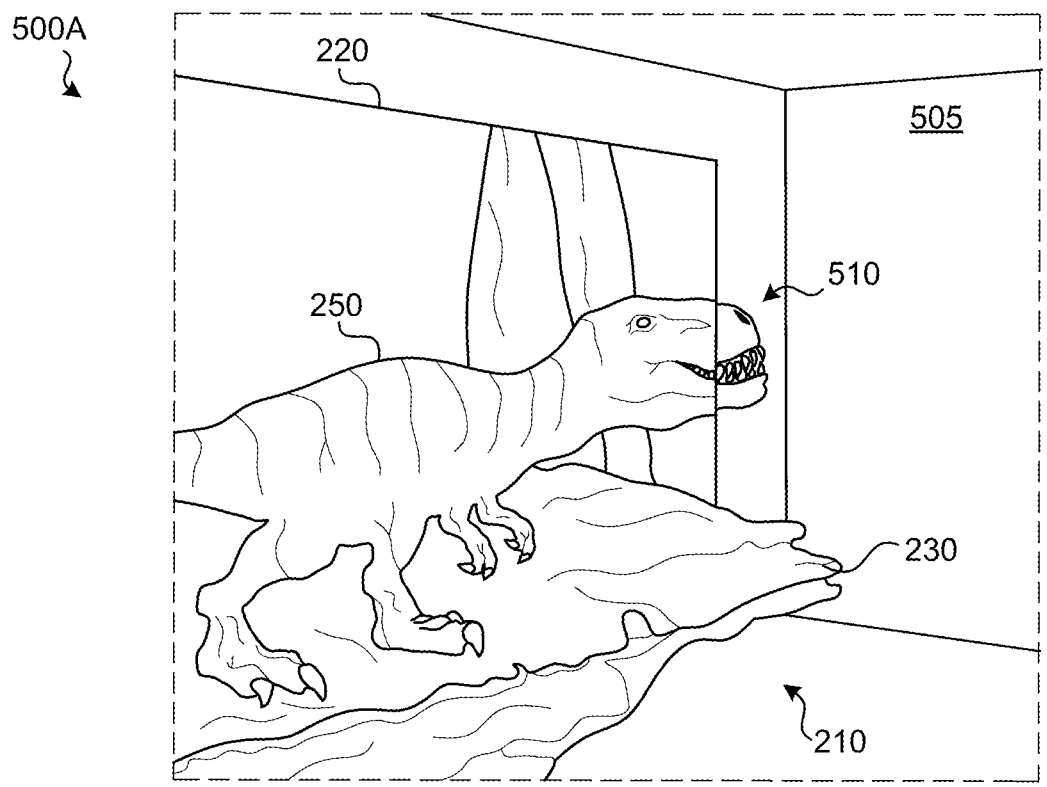
FIGS. 5A and 5B illustrate exemplary views of the electronic device of FIG. 1 in accordance with some implementations.
Figure 5B:
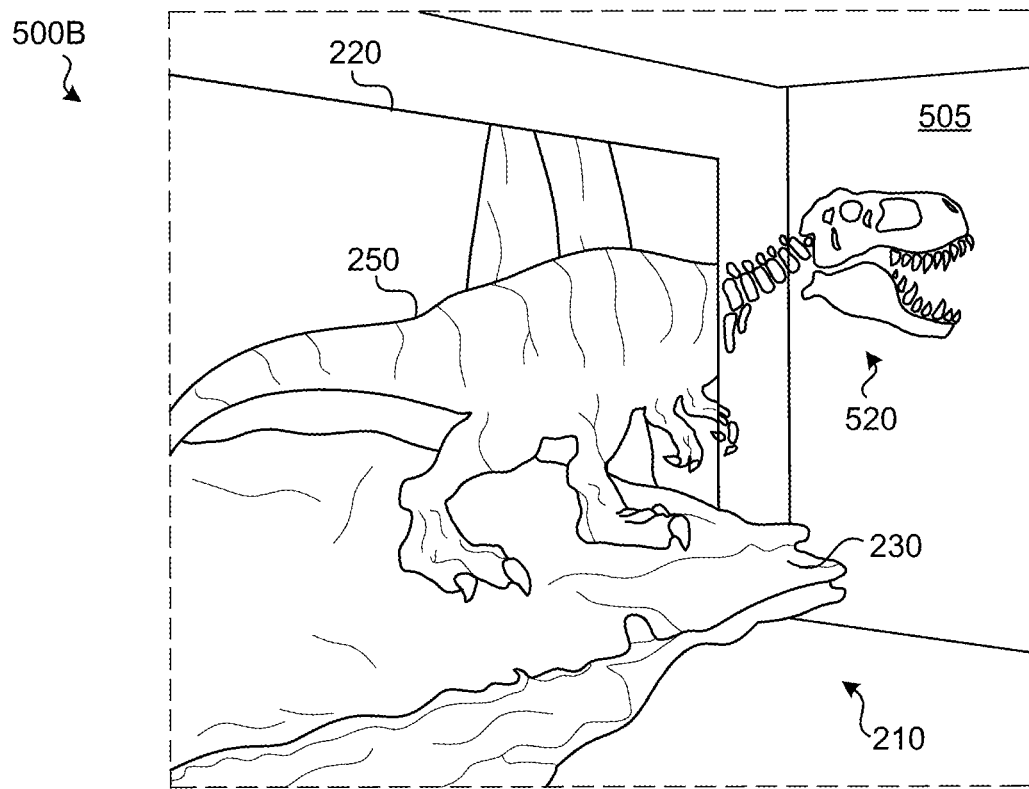

FIGS. 5A, 5B illustrate exemplary views 500A and 500B, respectively, of a 3D environment 505 provided by electronic device 110 of FIG. 1. The views 500A and 500B may be live camera views of the physical environment 100, views of the physical environment 100 through a see-through display, or views generated based on a 3D model corresponding to the physical environment 100. The views 500A and 500B include depictions of aspects of a physical environment 100 such as a representation 220 of screen 120 within a view 500 of the 3D environment 505.

Views 500A and 500B illustrate a different perspective view of content 210 than the views 200 and 300 of FIGS. 2 and 3, respectively. Each view 500A and 500B illustrates the character 250 and the foreground rock formation 230 as off-screen content (e.g., content presented in front of the bounded planar region of the representation 220 of the screen 120). View 500A illustrates the character 250 extending outside of the planar region and to the right of the representation 220 of the screen 120 as opposed to towards the viewer in FIGS. 2 and 3. For example, the content 210 may have a character walking off the screen, but techniques described herein may able to generate additional content for a particular object or all of the content and show that content extending in all directions outside of the planar region of the representation 220 of the screen 120. In some implementations, the content 210 may include the content to be rendered "off-screen".

Additionally, or alternatively, in some implementations, the techniques described herein can generate the additional content that may be shown off-screen. For example, as illustrated in view 500B of FIG. 5B, as the character 250 extends outside of the planar region of the representation 220 of the screen 120, techniques described herein can alter the view of the character 250. In this example, the character 250 (e.g., a dinosaur), can be transformed to be viewed as a skeleton whenever the character extends outside of the planar region of the representation 220 of the screen 120. Additionally, or alternatively, additional boundaries may be used by the techniques described herein other than the planar region of the representation 220 of the screen 120. For example, a bounding volume outside of the planar region of the representation 220 of the screen 120 may be defined by a particular distance away from that planar region (e.g., two meters in either direction). Thus, any content inside of the bounding box would appear as intended (e.g., the dinosaur (character 250) as shown in view 500A), and any content outside of the bounding box could be transformed to the skeleton view (e.g., the dinosaur (character 250) as shown in view 500B). Additionally, different transformation effects can be utilized when the content extends outside of the planar region of the representation 220 of the screen 120 and/or the bounding volume (e.g., fading, lighting effects, coloring, transparency, etc.).

FIGS. 6A-6D illustrate exemplary views 600A-600D, respectively, of a 3D environment 605 provided by electronic device 110 of FIG. 1. The views 600A-600D may be live camera views of the physical environment 100, views of the physical environment 100 through a see-through display, or views generated based on a 3D model corresponding to the physical environment 100. The views 600A-600D include depictions of aspects of a physical environment 100 such as a representation 220 of screen 120, representation 270 of wall hanging 170, representation 272 of wall hanging 172, and representation 274 of wall hanging 174 within a view 600 of the 3D environment 605.

FIGS. 6A-6D illustrate a single rendered frame of content 210 within the views 600A-600D of the 3D environment 605. In particular, the transition of the views 600A through 600D is of a single rendered frame of content 210 as the frame transitions (e.g., expands) within the 3D environment 605. The content 210 in the illustrated examples provided herein (e.g., a depiction of a dinosaur walking along a rocky cliff near a body of water) includes different types of content that can be displayed differently based on one or more criterion, as discussed herein. For example, the content 210 includes a foreground rock formation 230, a tree 232 on top of the foreground rock formation 230, a body of water 242, a sky 240, a mountain 244, and a character 250 (e.g., the dinosaur).

Figure 6A:
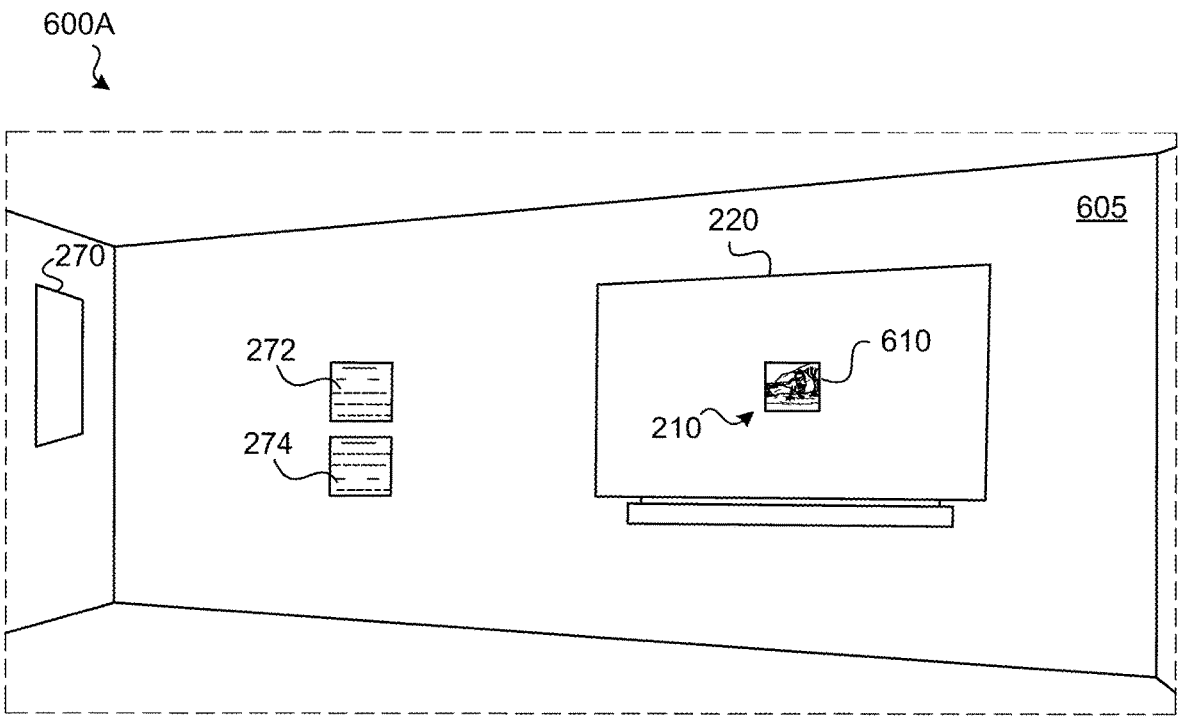
FIGS. 6A-6D illustrate exemplary views of the electronic device of FIG. 1 in accordance with some implementations.
Figure 6B:
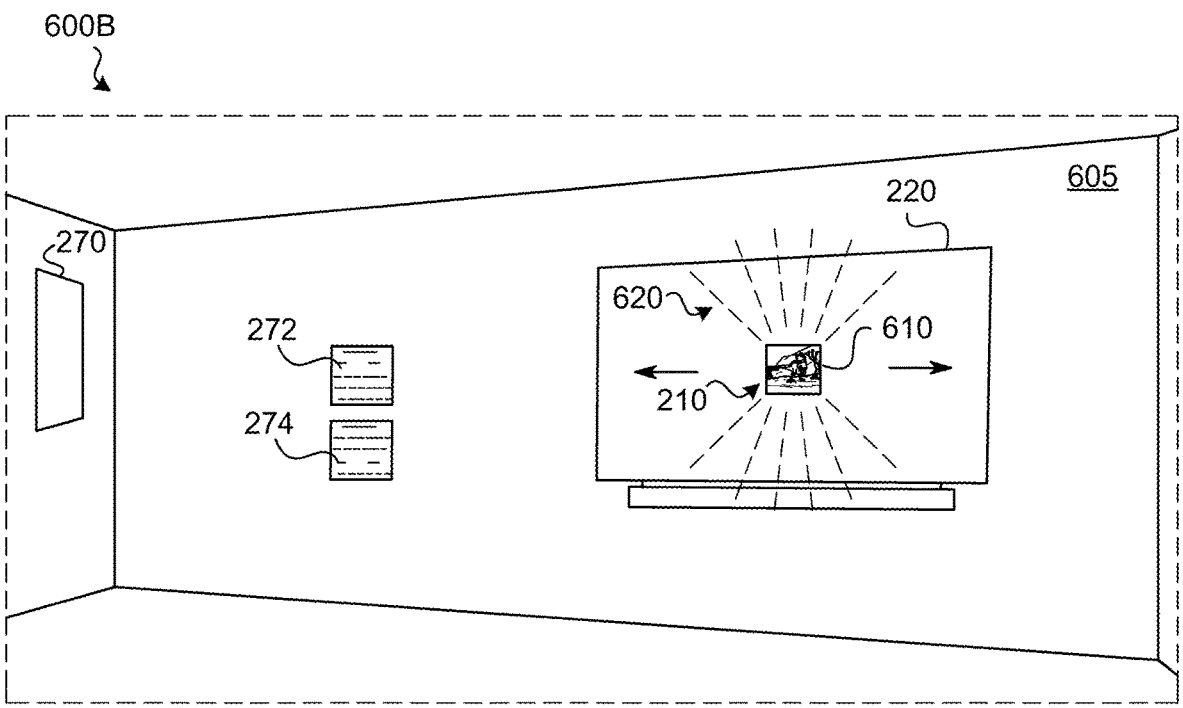
Figure 6C:
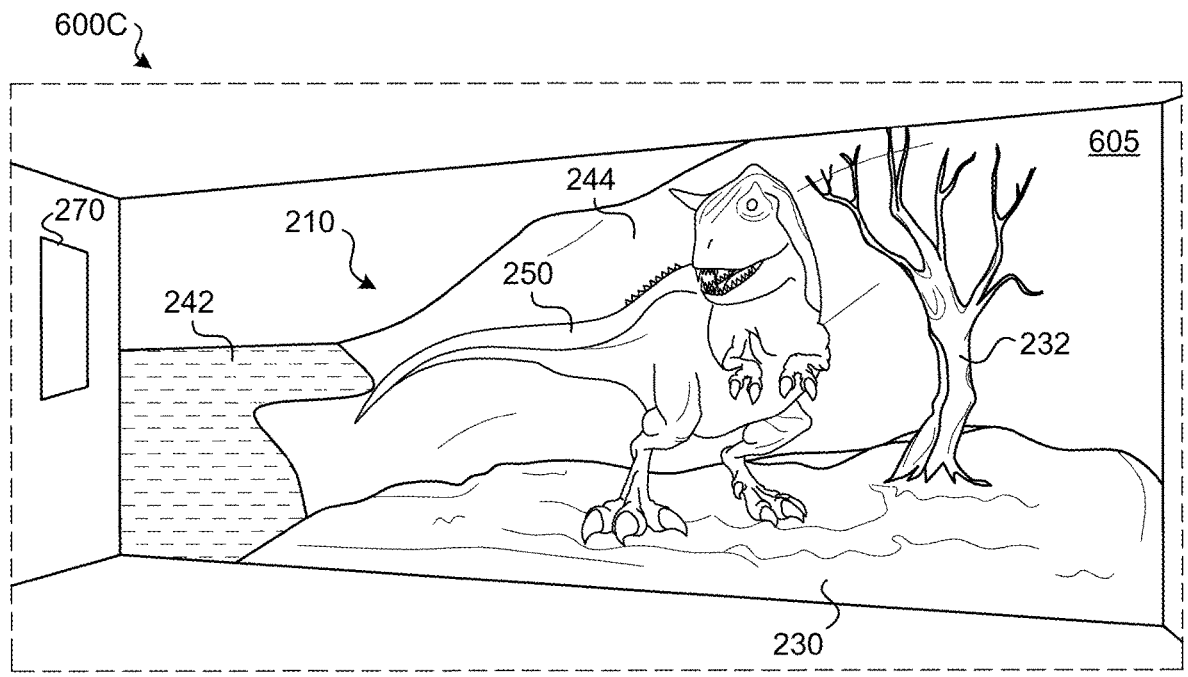
Figure 6D:
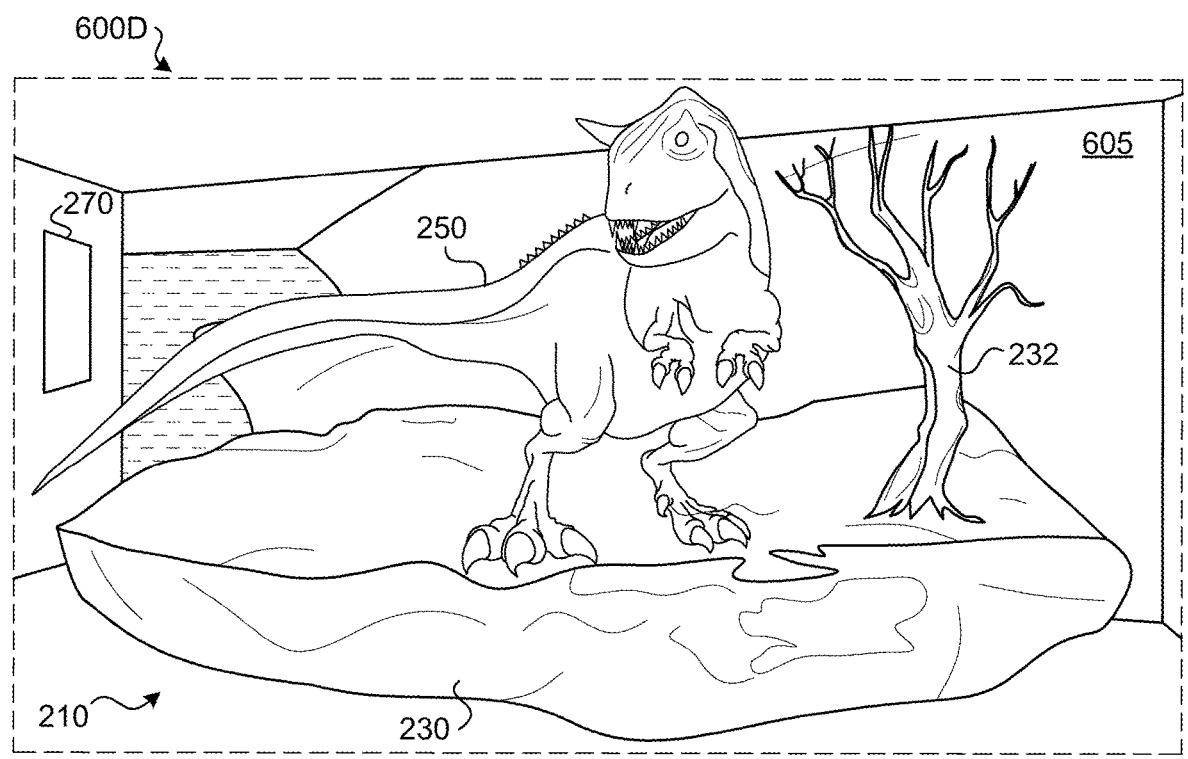

View 600A of FIG. 6A depicts the content 210 as being viewed on a two-dimensional bounded planar region of the representation 220 of the screen 120 (e.g., a virtual screen) within a thumbnail image 610 (e.g., a selectable icon). For example, the user 25 may view the content 210 via the device 110 as standard content as though it were shown on a television or projection screen (e.g., representation 220 of screen 120, a bounded planar region) by selecting the image 610 (e.g., reaching out to touch the icon, using a voice command, selecting the icon via an input device such as a wand or remote control, and the like). View 600B of FIG. 6B illustrates a transition effect 620 after the selection of the thumbnail image 610 (e.g., the user initiates a viewing of the content 210). View 600C of FIG. 6C illustrates positioning the content 210 on the bounded planar region of the entire wall of the representation 220 of the screen 120 and replacing the view of the representation 220 of screen 120, representation 272 of wall hanging 172, and representation 274 of wall hanging 174 (e.g., creates a large screen view of the content 210). In addition to illustrating a similar view of content 210 on the entire back wall as in view 600C, view 600D of FIG. 6D includes positioning different portions of the content 210 in front of the bounded planar region of the back wall. For example, some content such as background or midground content (e.g., on-screen content) may remain presented on the bounded planar region, and other content such as foreground content (e.g., off-screen content) may be presented as though it were coming out of the bounded planar region of the back wall. In particular, view 600D of FIG. 6D illustrates the character 250, the foreground rock formation 230, and at least portions of the tree 232 as foreground content and are presented in front of the back wall and coming out towards the user 25, while the remaining portions of the content 210 remain as viewed on the planar region of the back wall (e.g., body of water 242, sky 240, mountain 244, etc.). In some implementations, the character 250 may be the only portion of the content 210 that is provided as off-screen content. For example, a dog character being chased by the dinosaur (e.g., character 250) could be viewed as running around the 3D environment 605 and around the user 25 (e.g., within the view of the device 110, even if the user moves his or her head around the physical environment 100).

In some implementations, the content 210 of FIGS. 2-6 can be modified over time based on proximity of the electronic device to an anchored location (e.g., screen 120). For example, as the user 25 gets closer, spatialized audio notifications (e.g., audio content of the content 210) may indicate the closer proximity. Additionally, or alternatively, for a visual icon, the virtual content may increase in size or start flashing if the user starts to walk in a different direction away from the screen 120.

In some implementations, a visual transition effect (e.g., fading, blurring, etc.) may be applied to one or more portions of the content (e.g., character 250) to provide the user with a more enjoyable XR experience. For example, as a user turns away from virtual content by more than a threshold amount (e.g., outside of an activation zone), the visual transition effect may be applied to the virtual content. Defining the activation zone based on an anchored content object encourages a user to stay relatively stationary and provides a target object to focus on. As a user moves, the visual transition effect applied to the virtual content may indicate to the user that the virtual content is going to deactivate (e.g., fades away). Thus, the user can dismiss the virtual content by turning away from the virtual content. In some implementations, transitioning away or fading away the virtual content may be based on a rate of turning their head or electronic device 110 exceeding a threshold or an amount of turning their head or electronic device 110 exceeding a threshold, such that the virtual content will remain in the 3D location where it was just before the user turned their head or electronic device 110.

In some implementations, the system can detect the user's interaction with the content 210 (e.g., reaching out to "touch" the virtual content) and may generate and display an application window (e.g., interactive window 440). For example, a user 25 in FIG. 3, may provide a motion of reaching out to interact with the interactable element of area 430, and the system may then display a new application window (e.g., an archeological video). In some implementations, the system can detect that the user has temporarily moved his or her viewing direction to another location outside of an activation zone (e.g., an activation zone that contains a view of the content application window). For example, the user may look away from an initial activation zone in response to being briefly distracted by some event in the physical environment (e.g., another person in the room). The system, based on the user "looking away" from the initial activation zone, may start to fade away and/or shrink the interactive window 440. However, once the user has returned to a viewpoint that is similar or identical to the original view when the virtual content and an associated application window was initially active (e.g., within an activation zone), the system can return to displaying the virtual content (e.g., content 210) and an associated application window (e.g., interactive window 440) as initially intended when the user activated the application by interacting with the virtual content, before the user was briefly distracted.

Figure 7:
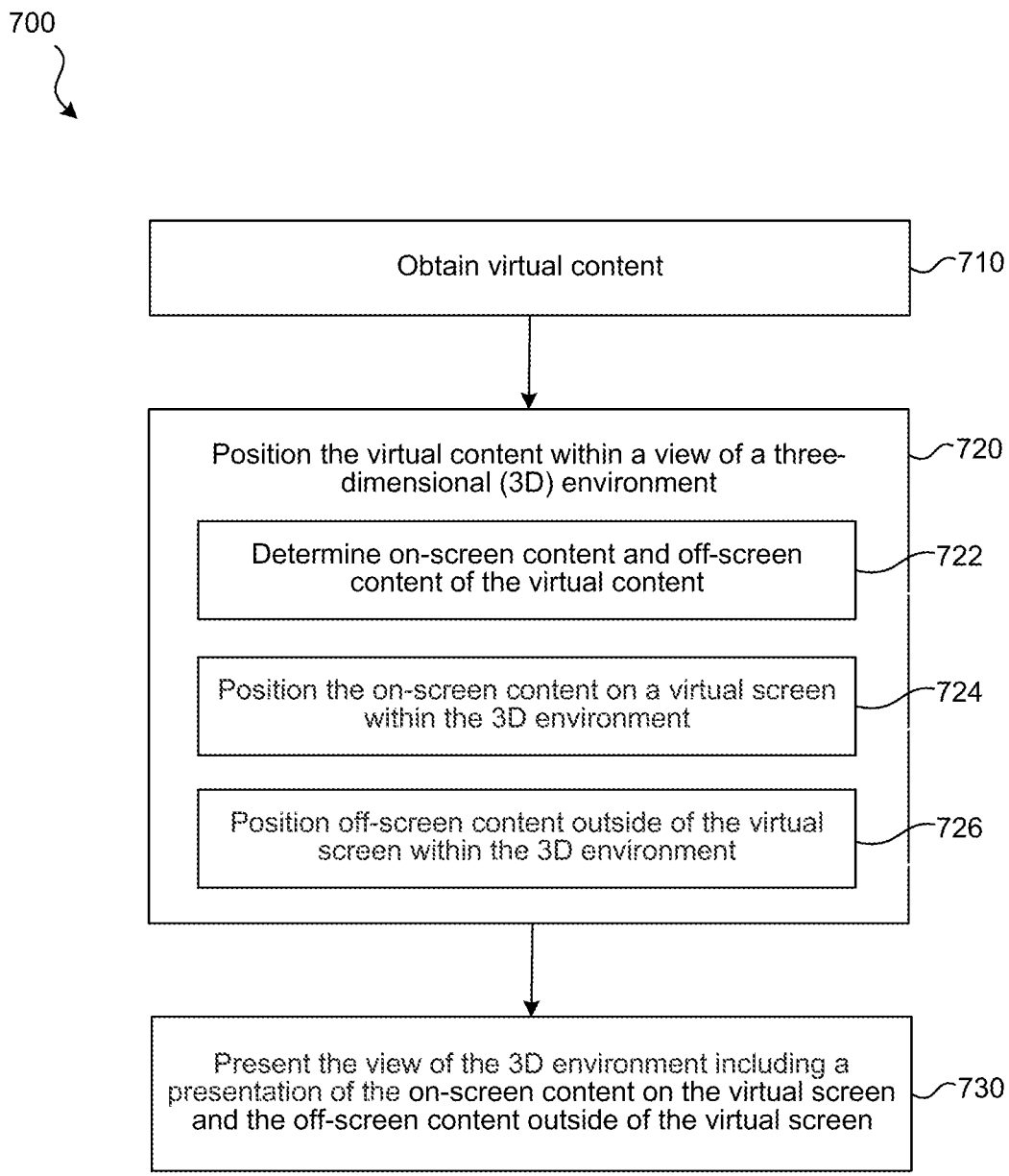
FIG. 7 is a flowchart representation of a method for presenting a view of a three-dimensional (3D) environment including a presentation of content in accordance with some implementations.

FIG. 7 is a flowchart illustrating an exemplary method 700. In some implementations, a device such as device 110 (FIG. 1) performs the techniques of method 700 of presenting a view of a 3D environment including a presentation of content. In some implementations, the techniques of method 700 are performed on a mobile device, desktop, laptop, HMD, or server device. In some implementations, the method 700 is performed on processing logic, including hardware, firmware, software, or a combination thereof. In some implementations, the method 700 is performed on a processor executing code stored in a non-transitory computer-readable medium (e.g., a memory).

At block 710, the method 700 obtains virtual content. In some examples, the virtual content may include 3D models or geometry (e.g., virtual content 210 may include an interactive 3D model representing character 250 and 3D models representing foreground rock formation 230, body of water 242, sky 240, and mountain 244). In some examples, the 3D models or geometry may include a virtual surface (e.g., a curved surface, such as a portion of a cylindrical shell) textured with 2D or 3D images or video for representing certain elements of the virtual content (e.g., body of water 242, sky 240, and mountain 244 may instead be depicted in the 2D or 3D images or video). The 3D images or video may include a 180° stereo image pair or 180° stereo video content stored as equirectangular projections. In some implementations, the video content includes a stereoscopic image pair including left eye content corresponding to a left eye viewpoint and right eye content corresponding to a right eye viewpoint. In some examples, the textured virtual surface may be used to represent background content of the virtual content (e.g., body of water 242, sky 240, mountain 244 of content 210) by being positioned behind (e.g., 10 m, 15 m, 20 m, or any other desired distance) a front viewing location of the virtual content (e.g., the planar region of the representation 220). For example, the textured virtual surface may include a portion of a cylindrical shell centered around a center of representation 220 having a radius (e.g., 10 m, 15 m, 20 m, or any other desired value) and height sufficient to cover views of the virtual content through representation 220.

In some examples, representing some elements of the virtual content using 3D models (e.g., the foreground and midground elements) and other elements of the virtual content using a textured virtual surface (e.g., the background elements) advantageously presents the virtual content with an acceptable quality while saving processing and power resources. In particular, the elements closer to the user (e.g., the foreground and midground elements) may be rendered at a higher quality using 3D models while elements farther from the user may be rendered at a lower, but still acceptable quality, using a 2D or 3D image textured onto a virtual surface. The lower quality rendering of the background elements is less likely to be noticed by the user due to their perceived distance.

At block 720, the method 700 positions the virtual content within a view of a 3D environment. Positioning the virtual content (block 720) includes determining on-screen content and off-screen content at block 722, positioning the on-screen content on a virtual screen (e.g., a rectangle/screen, or another shape) within the 3D environment at block 724, and positioning off-screen content outside of the virtual screen within the 3D environment at block 726. The 3D environment may include a physical environment, a virtual environment, or an XR environment.

In some implementations, determining the on-screen content and the off-screen content is based on a boundary corresponding to an outside edge of the virtual screen. For example, as illustrated in FIG. 2C, the character 250 and the foreground rock formation 230 are presented as off-screen content because they extend beyond the outside edge of representation 220, while the remaining portions of the virtual content 210 remain as viewed on the planar region of the representation 220 of the screen 120 (e.g., body of water 242, sky 240, mountain 244, etc.). In some implementations, determining the on-screen content and the off-screen content is based on a bounding volume associated with the virtual screen. For example, as discussed with reference to FIGS. 4A and 4B, a bounding box may be outside of the planar region of the representation 220 of the screen 120 and may be defined by a particular distance away from that planar region (e.g., two meters in either direction). Thus, any content inside of the bounding box would appear as intended (e.g., the dinosaur (character 250) as shown in view 400A), and any content outside of the bounding box could be transformed to the skeleton view (e.g., the dinosaur (character 250) as shown in view 400B).

In some implementations, the method 700 further includes determining the on-screen content and the off-screen content based on a boundary, tracking a 3D location of an object within the virtual content, dynamically updating the boundary based on the 3D location of the object, and updating the view of the 3D environment based on the 3D location of the object and the updated boundary. For example, a virtual screen crossing threshold could dynamically adjust and extend to a character that is extending outside of the original bounds. For example, a butterfly may be a determined character in the virtual content 210 that is flying outside of the original flat barrier (e.g., representation 220 of the screen 120), then the on-screen content could be made to appear based on a distance to this butterfly (e.g., other characters are determined to be off-screen content versus on-screen content differently based on a distance and a threshold barrier that is associated with the butterfly).

At block 730, the method 700 presents the view of the 3D environment including a presentation of the on-screen content on the virtual screen and the off-screen content outside of the virtual screen. For example, an on-screen portion of the virtual content (e.g., background) is presented on a virtual screen (e.g., on a bounded planar region) and an off-screen portion of the virtual content (e.g., foreground, midground, characters, certain objects) may be presented in front of that virtual screen or extend up/down/left/right beyond the confines of the virtual screen. The on-screen portion may be stereo and thus still have a 3D appearance. The 3D appearance of the off-screen content may be emphasized by its positioning at 3D positions in front of or beyond the boundaries of the virtual screen, e.g., a dinosaur may appear to be walking toward the viewer in the viewer's room. Determining which portions of the virtual content are on-screen versus off-screen may be predetermined or determined at runtime, e.g., based on crossing a boundary line (e.g., tracking when dinosaur crosses boundary, based on input, user gaze/position, scene understanding, etc.).

In some implementations, the method 700 further includes tracking a 3D location of an object within the virtual content and updating the view of the 3D environment based on the 3D location of the object. For example, the dinosaur (e.g., character 250) crosses a particular boundary and a portion or all of the dinosaur is shown as off-screen content or may be moved back to within the virtual screen (e.g., moved back within the bounded planar region of the representation 220 of the screen 120).

In some implementations, the method 700 further includes determining, based on the 3D location of the object within the virtual content, that the object is on-screen content, off-screen content, or a combination thereof. For example, the techniques described herein can determine whether an object (e.g., character 250) is to be rendered outside of the bounded planar region of the virtual screen. Alternatively, the virtual content may include information (e.g., 3D positioning data) that could indicate to the system to display one or more objects outside of the bounded planar region of the virtual screen (e.g., knowing a user is wearing an HMD such as device 110).

In some implementations, the method 700 further includes modifying a level of ambient light based on the positioning of the off-screen content outside of the virtual screen within the 3D environment. For example, ambient lighting of the 3D environment outside of the virtual screen may be altered based on the content elements exiting the virtual screen. For example, during the playing of a dark movie, the ambient lighting of the 3D environment may be dark, but when a flash or brighter scene is shown, then additional lighting may be provided from a location that is not from the location of the virtual screen (e.g., a flash light that seems to appear from behind or the side of the user 25 when he or she is viewing the content in front of them). In some implementations, the level of ambient light is modified within a threshold distance proximate to the off-screen content. For example, ambient lighting may be modified near the off-screen content, such as near the foreground area only, and not the entire room.

In some implementations, the method 700 further includes determining a scene understanding of the 3D environment based on obtaining sensor data corresponding to the 3D environment, wherein the scene understanding determines geometric properties of one or more objects. For example, this object includes properties similar to a couch in the 3D environment. In some implementations, determining a scene understanding may include identifying one or more of the objects and their positions based on images of the user's current room, depth data, etc. After determining a scene understanding, the method 700 may further include updating the view of the 3D environment based on the scene understanding of the 3D environment. For example, a scene understanding of the physical environment may be utilized to further customize the experience. For example, a falling leaf from a tree may land on the viewer's coffee table, or a character in the movie may interact with the scene: "Hey, nice couch".

In some implementations, the method 700 further includes obtaining user information for a viewer of the view 3D environment and updating the view of the 3D environment based on the user information. For example, the view of the 3D environment may be updated based on a user looking at or looking away from a particular object, such as a dinosaur, or a particular character that could interact with the viewer based on the user information. The user information may include at least one of head pose data, positional information of the viewer within the 3D environment, and/or physiological data (e.g., eye gaze characteristics). In some implementations, sensor data (e.g., image, sound, motion, etc.) may be obtained from a sensor of the electronic device 110 in a physical environment 100. The sensor data may include tracking a gaze direction, and detecting that the gaze direction corresponds to the virtual screen. In some implementations, tracking the gaze of a user may include tracking which pixel(s) the user's gaze is currently focused upon. For example, obtaining physiological data associated with a gaze of a user may involve obtaining images of the eye or electrooculography signal (EOG) data from which gaze direction and/or movement can be determined. In some implementations, the 3D environment may be an XR environment provided while a user wears a device such as an HMD. Additionally, the XR environment may be presented to the user where virtual reality images maybe overlaid onto the live view (e.g., augmented reality (AR)) of the physical environment. In some implementations, tracking the gaze of the user relative to the display includes tracking a pixel the user's gaze is currently focused upon.

In some implementations, the off-screen content includes an active object and foreground content and positioning the off-screen content outside of the virtual screen within the 3D environment includes positioning the active object at a first 3D location at a first distance away from the virtual screen and positioning the foreground content at a second 3D location at a second distance away from the virtual screen, wherein the first distance is different than the second distance. For example, the foreground content may have a different threshold than the character. For example, the foreground may stop at 5 feet from the virtual screen (e.g., foreground rock formation 230), but the character can extend further (e.g., a dog can run around your room) from the virtual screen.

In some implementations, the virtual content includes one or more selectable objects, and the method 700 further includes detecting a user interaction with a first object of the one or more selectable objects when presenting the view of the 3D environment and updating the view of the 3D environment based on detecting the user interaction. For example, a viewer can select a dog in the movie, and the dog could then run around the 3D environment.

In some implementations, the method 700 further includes determining a positional relationship of a viewpoint of the view relative to the virtual content in the 3D environment and updating the view of the 3D environment based on the positional relationship. For example, as a user gets closer or further away from the virtual screen (e.g., a different viewpoint), the off-screen content may be altered. In some implementations, the method 700 further includes determining a position to project the virtual content within the 3D environment based on a viewpoint of the view of the 3D environment.

In some implementations, determining the 3D position of displaying off screen content is based on tracking a pose of the electronic device relative to the physical environment, and detecting, based on the pose of the electronic device, that a view of a display of the electronic device is oriented towards the off-screen content. For example, position sensors may be utilized to acquire positioning information of the device (e.g., device 110). For the positioning information, some implementations include a VIO system to determine equivalent odometry information using sequential camera images (e.g., light intensity images such as RGB data) to estimate the distance traveled. Alternatively, some implementations of the present disclosure may include a SLAM system (e.g., position sensors). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In some implementations, spatialized audio may be used in conjunction with or in lieu of presenting the virtual content. In an exemplary implementation, the 3D position of the virtual content includes a 3D location that is at a first distance from the electronic device, the 3D location of the virtual content of the view of the physical environment is at a second distance from the electronic device that is greater than the first distance, and presenting the virtual content in the view of the physical environment includes presenting spatialized audio at a perceived distance to a sound source based on the 3D location of the virtual content. For example, spatialized audio may be used that will be heard by the user as being "behind" the content. For example, based on the detected plane of the screen 120, a perceived distance to a sound source may be implemented.

In some implementations, physiological based tracking, such as skeleton tracking, may be used for instruction, evaluation, and feedback relating to exercise, motion, clothing, etc. In an exemplary implementation, the sensor data includes physiological data of a user of the electronic device, and the method 700 further includes detecting movements of the user based on the physiological data and modifying the virtual content in the view of the physical environment based on the detected movements of the user. For example, characters within the virtual content may interact with the user 25 based on the movements of the user 25.

In some implementations, the method includes detecting an event that a user is focused on a character or there is a selection of a character to interact with based on tracking facial features of a user of the electronic device. In some implementations, the sensor data includes images of a head of a user of the electronic device and detecting the event is based on determining that the head of the user is rotating in a yaw direction (e.g., about a vertical axis).

In some implementations, the method 700 further includes determining a context associated with the use of the electronic device in the physical environment based on sensor data, and presenting the virtual content based on the context. For example, determining the context may include detecting that the user is in a situation in which the user would benefit from presenting virtual content (e.g., a particular app), such as the time of day. Various ways of detecting context of a physical environment may be used by method 700. In some implementations, detecting the context includes determining use of the electronic device in a new location (e.g., presenting virtual content in a hotel room the user has not been to previously). In some implementations, detecting the context includes determining use of the electronic device during a type of activity (e.g., working, exercising, relaxing watching a movie, etc.). In some implementations, detecting the context includes determining that the electronic device is within a proximity threshold distance of a location, an object, another electronic device, or a person.

In some examples, method 700 may further include a privacy setting mode based on determining that no other person is present (or may be triggered by the user themselves). In an exemplary implementation, techniques may include determining a scene understanding of the physical environment based on the sensor data, determining, based on the scene understanding, that a user of the electronic device is the only user within an area associated with the view of the physical environment, and presenting the virtual content based on a user preference setting associated with the user being the only user within the area associated with the view of the physical environment. For example, a user may only want the interactions of a character within the entire room of the 3D environment (e.g., a virtual dog running around the room) if he or she is the only person currently in the room.

Figure 8:
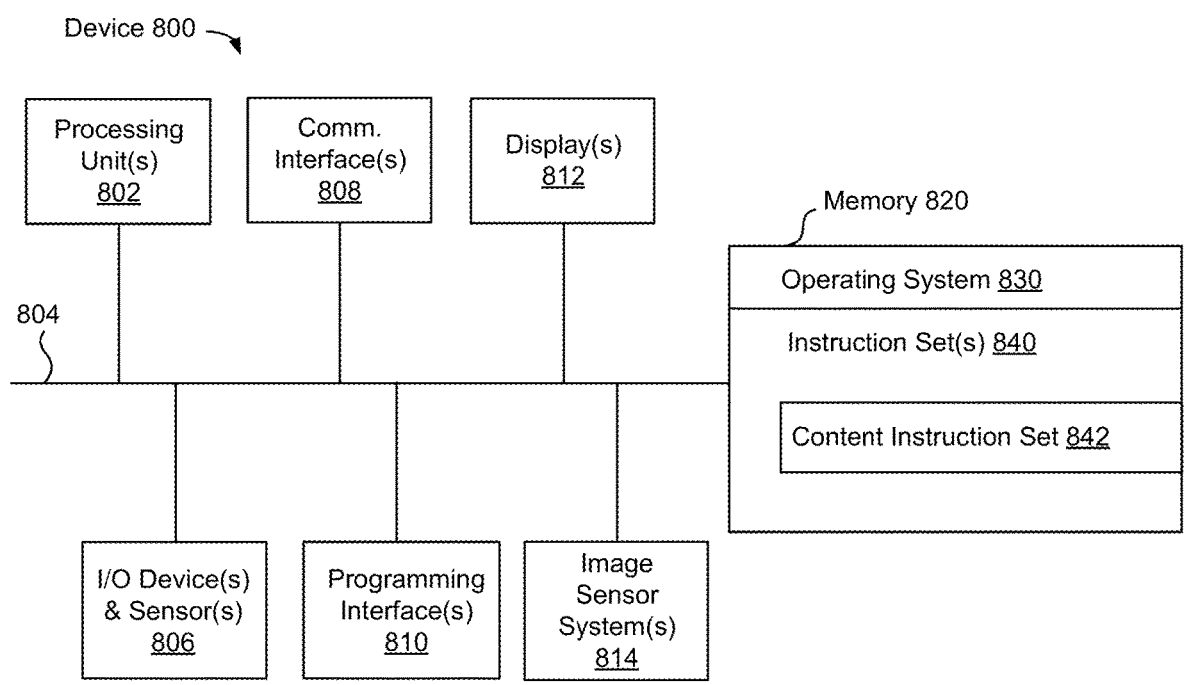
FIG. 8 illustrates device components of an exemplary device according to some implementations.

FIG. 8 is a block diagram of an example device 800. Device 800 illustrates an exemplary device configuration for device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 110 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 110 includes a single display. In another example, the device 110 includes a display for each eye of the user.

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein. The instruction set(s) 840 include a content instruction set 842. The instruction set(s) 840 may be embodied a single software executable or multiple software executables.

In some implementations, the content instruction set 842 is executable by the processing unit(s) 802 to provide and/or track content for display on a device. The content instruction set 842 may be configured to monitor and track the content over time (e.g., while viewing an XR environment), and generate and display virtual content (e.g., an application associated with the determined 3D position of a 3D video within the 3D environment). To these ends, in various implementations, the instruction includes instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 9:
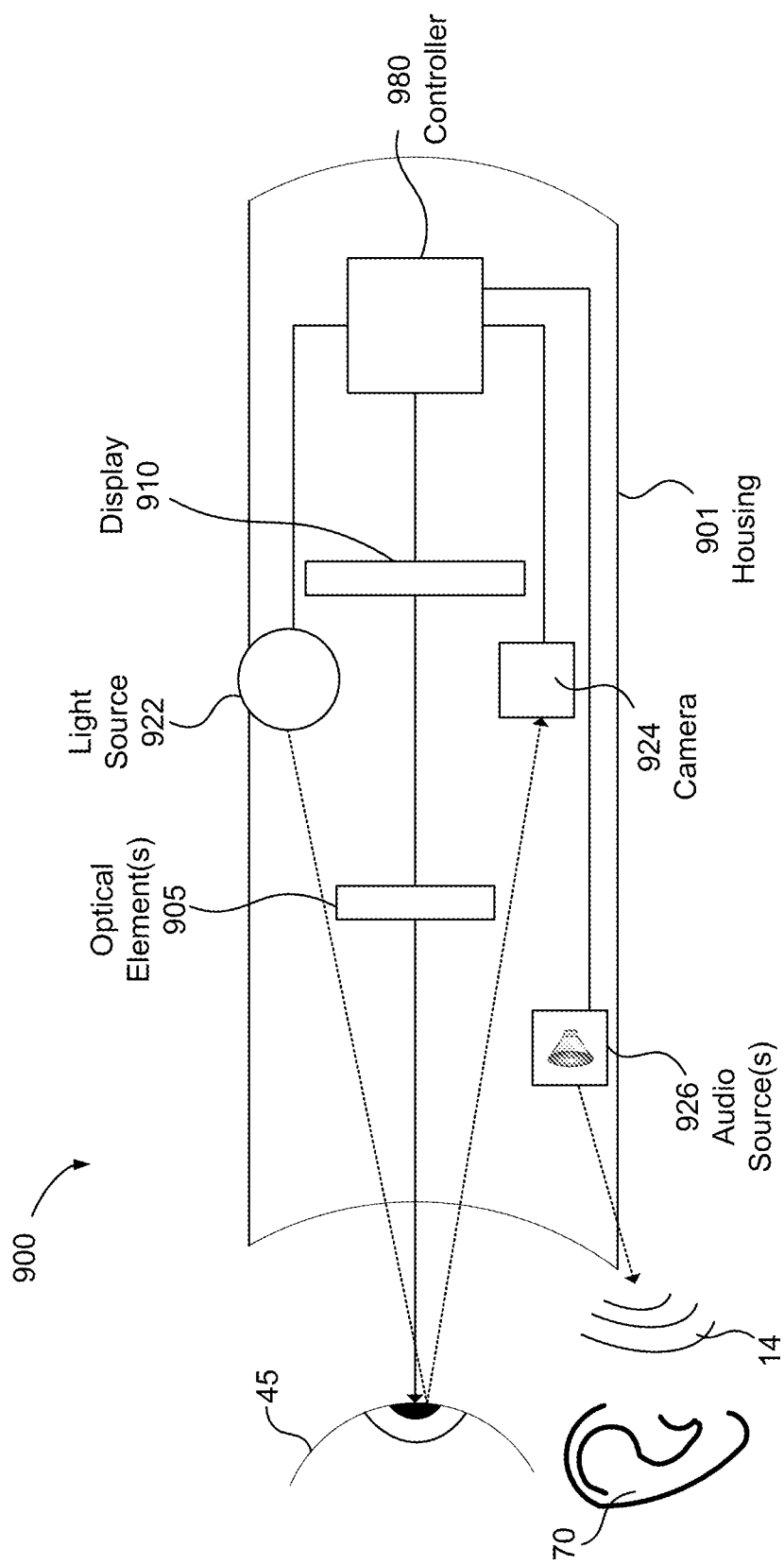
FIG. 9 illustrates an example of an HMD in accordance with some implementations.

FIG. 9 illustrates a block diagram of an exemplary head-mounted device 900 in accordance with some implementations. The head-mounted device 900 includes a housing 901 (or enclosure) that houses various components of the head-mounted device 900. The housing 901 includes (or is coupled to) an eye pad (not shown) disposed at a proximal (to the user 25) end of the housing 901. In various implementations, the eye pad is a plastic or rubber piece that comfortably and snugly keeps the head-mounted device 900 in the proper position on the face of the user 25 (e.g., surrounding the eye 45 of the user 25).

The housing 901 houses a display 910 that displays an image, emitting light towards or onto the eye of a user 25. In various implementations, the display 910 emits the light through an eyepiece having one or more optical elements 905 that refracts the light emitted by the display 910, making the display appear to the user 25 to be at a virtual distance farther than the actual distance from the eye to the display 910. For example, optical element(s) 905 may include one or more lenses, a waveguide, other diffraction optical elements (DOE), and the like. For the user 25 to be able to focus on the display 910, in various implementations, the virtual distance is at least greater than a minimum focal distance of the eye (e.g., 6 cm). Further, in order to provide a better user experience, in various implementations, the virtual distance is greater than 1 meter.

The housing 901 also houses an eye/gaze tracking system including one or more light sources 922, camera 924, and a controller 980. The one or more light sources 922 emit light onto the eye of the user 25 that reflects as a light pattern (e.g., a circle of glints) that can be detected by the camera 924. Based on the light pattern, the controller 980 can determine an eye tracking characteristic of the user 25. For example, the controller 980 can determine a gaze direction and/or a blinking state (eyes open or eyes closed) of the user 25. As another example, the controller 980 can determine a pupil center, a pupil size, or a point of regard. Thus, in various implementations, the light is emitted by the one or more light sources 922, reflects off the eye 45 of the user 25, and is detected by the camera 924. In various implementations, the light from the eye 45 of the user 25 is reflected off a hot mirror or passed through an eyepiece before reaching the camera 924.

The housing 901 also houses an audio system that includes one or more audio source(s) 926 that the controller 980 can utilize for providing audio to the user's ears 70 via sound waves 14 per the techniques described herein. For example, audio source(s) 926 can provide sound for both background sound and the auditory stimulus that can be presented spatially in a 3D coordinate system. The audio source(s) 926 can include a speaker, a connection to an external speaker system such as headphones, or an external speaker connected via a wireless connection.

The display 910 emits light in a first wavelength range and the one or more light sources 922 emit light in a second wavelength range. Similarly, the camera 924 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 910 by looking at it), provide foveated rendering (e.g., present a higher resolution in an area of the display 910 the user 25 is looking at and a lower resolution elsewhere on the display 910), or correct distortions (e.g., for images to be provided on the display 910).

In various implementations, the one or more light sources 922 emit light towards the eye of the user 25 which reflects in the form of a plurality of glints.

In various implementations, the camera 924 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 924 is an event camera including a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   obtaining virtual content;
   positioning the virtual content within a view of a three-dimensional (3D) environment, wherein positioning the virtual content comprises:
   determining on-screen content and off-screen content of the virtual content, wherein the on-screen content and the off-screen content correspond to a virtual screen, the virtual screen comprising a bounded planar region,
   positioning the on-screen content on the virtual screen within the 3D environment, and
   positioning off-screen content outside of the virtual screen within the 3D environment; and
   presenting the view of the 3D environment comprising a presentation of the on-screen content on the virtual screen and the off-screen content outside of the virtual screen.

2. The method of claim 1, wherein the virtual content comprises an object, and wherein the method further comprises:
   tracking a 3D location of the object within the virtual content; and
   updating the view of the 3D environment based on the 3D location of the object.

3. The method of claim 2, further comprising:
   determining, based on the 3D location of the object within the virtual content, that the object is on-screen content, off-screen content, or a combination thereof.

4. The method of claim 1, further comprising:
   modifying a level of ambient light based on the positioning of the off-screen content outside of the virtual screen within the 3D environment.

5. The method of claim 4, wherein the level of ambient light is modified within a threshold distance proximate to the off-screen content.

6. The method of claim 1, further comprising:
   determining a scene understanding of the 3D environment based on obtaining sensor data corresponding to the 3D environment, wherein the scene understanding determines geometric properties of one or more objects in the 3D environment; and
   updating the view of the 3D environment based on the scene understanding of the 3D environment.

7. The method of claim 1, further comprising:
   obtaining user information for a viewer of the view of the 3D environment; and
   updating the view of the 3D environment based on the user information.

8. The method of claim 7, wherein the user information comprises at least one of:
head pose data;
positional information of the viewer within the 3D environment; and
physiological data.

9. The method of claim 1, wherein the off-screen content comprises an active object and foreground content, and wherein positioning the off-screen content outside of the virtual screen within the 3D environment comprises:
positioning the active object at a first 3D location at a first distance away from the virtual screen; and
positioning the foreground content at a second 3D location at a second distance away from the virtual screen, wherein the first distance is different than the second distance.

10. The method of claim 1, wherein the virtual content comprises one or more selectable objects, the method further comprising:
detecting a user interaction with a first object of the one or more selectable objects when presenting the view of the 3D environment; and
updating the view of the 3D environment based on detecting the user interaction.

11. The method of claim 1, wherein determining the on-screen content and the off-screen content is based on a boundary corresponding to an outside edge of the virtual screen.

12. The method of claim 1, wherein determining the on-screen content and the off-screen content is based on a bounding box associated with the virtual screen.

13. The method of claim 1, wherein determining the on-screen content and the off-screen content is based on a boundary, the method further comprising:
tracking a 3D location of an object within the virtual content;
updating the boundary based on the 3D location of the object; and
updating the view of the 3D environment based on the 3D location of the object and the updated boundary.

14. The method of claim 1, further comprising:
determining a positional relationship of a viewpoint of the view relative to the virtual content in the 3D environment; and
updating the view of the 3D environment based on the positional relationship.

15. The method of claim 1, wherein the virtual content comprises one or more 3D models, and wherein the off-screen content is represented by at least one of the one or more 3D models.

16. The method of claim 15, wherein the on-screen content is represented by at least another of the one or more 3D models.

17. The method of claim 1, wherein the virtual content comprises a virtual surface textured with a 2D image, 3D image, 2D video, or a 3D video.

18. The method of claim 17, wherein the 3D image comprises a stereoscopic image pair comprising left eye content corresponding to a left eye viewpoint and right eye content corresponding to a right eye viewpoint.

19. The method of claim 17, wherein the 3D video comprises stereo video content stored as equirectangular projections.

20. The method of claim 17, wherein at least a portion of the on-screen content is represented by the textured virtual surface.

21. The method of claim 17, wherein the virtual surface comprises a portion of a cylindrical shell.

22. The method of claim 17, wherein the virtual surface is centered around a center of the virtual screen.

23. The method of claim 1, further comprising:
determining a position to project the virtual content within the 3D environment based on a viewpoint of the view of the 3D environment.

24. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining virtual content;
positioning the virtual content within a view of a three-dimensional (3D) environment, wherein positioning the virtual content comprises:
determining on-screen content and off-screen content of the virtual content, wherein the on-screen content and the off-screen content correspond to a virtual screen, the virtual screen comprising a bounded planar region,
positioning the on-screen content on the virtual screen within the 3D environment, and
positioning off-screen content outside of the virtual screen within the 3D environment; and
presenting the view of the 3D environment comprising a presentation of the on-screen content on the virtual screen and the off-screen content outside of the virtual screen.

25. A non-transitory computer-readable storage medium, storing computer-executable program instructions on a device to perform operations comprising:
obtaining virtual content;
positioning the virtual content within a view of a three-dimensional (3D) environment, wherein positioning the virtual content comprises:
determining on-screen content and off-screen content of the virtual content, wherein the on-screen content and the off-screen content correspond to a virtual screen, the virtual screen comprising a bounded planar region,
positioning the on-screen content on the virtual screen within the 3D environment, and
positioning off-screen content outside of the virtual screen within the 3D environment; and
presenting the view of the 3D environment comprising a presentation of the on-screen content on the virtual screen and the off-screen content outside of the virtual screen.

\* \* \* \* \*